(12) United States Patent
Wang et al.

(10) Patent No.: US 12,105,951 B2
(45) Date of Patent: Oct. 1, 2024

(54) DATA MANAGEMENT METHOD FOR APPLICATION, SYSTEM, AND COMPUTER DEVICE

(71) Applicant: Huawei Technologies Co., Ltd., Shenzhen (CN)

(72) Inventors: Yibin Wang, Beijing (CN); Long Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1 day.

(21) Appl. No.: 18/069,576

(22) Filed: Dec. 21, 2022

(65) Prior Publication Data

US 2023/0122315 A1 Apr. 20, 2023

Related U.S. Application Data

(63) Continuation of application No. PCT/CN2021/092901, filed on May 10, 2021.

(30) Foreign Application Priority Data

Jun. 23, 2020 (CN) .......................... 202010580541.1
Sep. 29, 2020 (CN) .......................... 202011052507.3

(51) Int. Cl.
 G06F 3/06 (2006.01)
(52) U.S. Cl.
 CPC .......... G06F 3/0604 (2013.01); G06F 3/0644 (2013.01); G06F 3/0673 (2013.01)
(58) Field of Classification Search
 None
 See application file for complete search history.

(56) References Cited

U.S. PATENT DOCUMENTS

| 7,549,016 | B2 * | 6/2009 | Fujibayashi | ............ G06F 3/067 |
| | | | | 711/170 |
| 8,429,307 | B1 * | 4/2013 | Faibish | ................. G06F 3/0689 |
| | | | | 710/33 |
| 2012/0290789 | A1 * | 11/2012 | Susarla | ............... G06F 12/0866 |
| | | | | 711/E12.017 |

* cited by examiner

*Primary Examiner* — Charles J Choi
(74) *Attorney, Agent, or Firm* — Conley Rose, P.C.

(57) ABSTRACT

A data management method includes obtaining information about an application, where the information about the application includes but is not limited to one or more of I/O operation information of the application, running information of the application, and process information of the application; and formulating and executing a specific storage policy for specific information of the application.

20 Claims, 16 Drawing Sheets

DATA MANAGEMENT METHOD FOR APPLICATION, SYSTEM, AND COMPUTER DEVICE

CROSS-REFERENCE TO RELATED APPLICATIONS

This application is a continuation of International Patent Application No. PCT/CN2021/092901, filed on May 10, 2021, which claims priority to Chinese Patent Application No. 202011052507.3, filed on Sep. 29, 2020, and Chinese Patent Application No. 202010580541.1, filed on Jun. 23, 2020. All of the aforementioned patent applications are hereby incorporated by reference in their entireties.

TECHNICAL FIELD

The present disclosure relates to the field of information technologies, and in particular, to a data management method for an application, a system, and a computer device.

BACKGROUND

In a current distributed storage system, a data storage manner is basically configured in advance, or a data storage policy is specified when a user creates a directory. For example, in a file system, a default quantity of strips of a file is 1, and a default strip size is 1 megabyte (MB). After creating a directory, a user can use a special command to specify a quantity of strips and/or a strip size of a file created in the directory.

In this data storage manner, a specific input/output (I/O) mode or a specific application may have good performance. However, when an I/O mode of an application is complex or a plurality of applications use one distributed file system at the same time, a fixed data layout cannot meet requirements of different applications.

SUMMARY

Embodiments of the present disclosure provide a data management method for an application, a system, and a computer device, to resolve a problem in the conventional technology that targeted data management cannot be implemented for a specific application.

According to a first aspect, an embodiment of the present disclosure provides a data management method for an application. Data of the application is stored in a storage system, the storage system includes at least one storage node, and the method includes: obtaining information about the application, where the information about the application includes at least one of the following information: I/O operation information of the application, running information of the application, and process information of the application; formulating a storage policy for the application based on the information about the application; and executing the storage policy.

According to the foregoing method, the storage policy for the application can be formulated and executed based on the information about the application, so that storage of data read and written by the application in the storage system can be optimized and/or access efficiency can be improved. Compared with the conventional technology in which a policy applicable to all applications is configured in a preset manner, in this method, a computer device can formulate different policies for different applications, to effectively improve compatibility of data storage and data read/write for different applications.

Optionally, the storage node may be a server or a computer device that includes a storage resource. The storage resource may include a memory, a solid-state drive (SSD), a hard disk drive (HDD), a magnetic tape, or the like.

Optionally, the I/O operation information of the application includes but is not limited to at least one of the following information: a size of data of an I/O operation performed by the application, a location of the data of the I/O operation performed by the application in the storage system, a manner in which the application performs the I/O operation, an identifier of the I/O operation performed by the application, a type of the I/O operation performed by the application, an I/O mode (sequential, stride, random, read-only, write-only, mixed read/write, and the like) of data accessed by each process in the application, a type of the data of the I/O operation performed by the application, duration of the I/O operation performed by the application, a life cycle of the data of the I/O operation performed by the application, a redundancy policy for the data of the I/O operation performed by the application, shared information of the data of the I/O operation performed by the application, or the like.

Optionally, the running information of the application includes but is not limited to at least one of the following information: an identifier of a node on which the application runs, a name of the node on which the application runs, an Internet Protocol (IP) address of the node on which the application runs, a name of a node on which the data of the I/O operation performed by the application is located, an identifier of the node on which the data of the I/O operation performed by the application is located, or the like.

Optionally, the information about the process for executing the application includes but is not limited to at least one of the following information: an identifier of a job for executing the application, a feature of the job for executing the application, an identifier of the process for executing the application, information about specific data processed by the application in a specific process on a specific node, or the like. The job for executing the application may include one or more processes.

In some possible implementations, the method further includes formulating the storage policy for the application before the application runs or when a data processing request of the application is received. In some possible implementations, the method further includes obtaining feature information of the storage system; and formulating the storage policy for the application based on the information about the application and the feature information of the storage system.

In some possible implementations, the feature information of the storage system includes at least one of the following information: a hardware structure of the storage system, hardware components of the storage system, a storage capacity of the storage system, or a data layout of the storage system.

The hardware structure of the storage system is a location relationship or a connection relationship between different components in the storage system, and the hardware components of the storage system are physical forms of the different components in the storage system. For example, the hardware components of the storage system may include an SSD and an HDD. The hardware structure of the storage system indicates that the SSD is a level-2 storage resource, the HDD is a level-3 storage resource, and a connection relationship exists between the SSD and the HDD.

The storage policy is formulated for the application with reference to the information about the application and the feature information of the storage system, so that a feature of the storage system can be better matched, storage of the data of the I/O operation performed by the application in the storage system can be further optimized, and efficiency of performing the I/O operation by the application can be improved.

In some possible implementations, the storage policy for the application includes a data layout policy, and the data layout policy is used to determine a storage manner and/or a storage location of data written by the application to the storage system.

In some possible implementations, the storage manner of data written by the application to the storage system includes at least one of the following information: a structure type of data that needs to be stored by the application, a quantity of copies of the data that needs to be stored by the application, or a parity mode of the data that needs to be stored by the application.

For example, the data layout policy may include allocating continuous storage space to data to be written to a storage device by an application, to improve data write efficiency; or may be determining whether the to-be-written data is stored in a single copy or a plurality of copies, or may be determining erasure code (EC) or a redundant array of independent disks (RAID) of the to-be-written data.

In some possible implementations, the storage policy for the application includes a cache policy, the cache policy is used to determine data read by the application from the storage system and a cache mode of the read data, and the cache mode of the data includes at least one of the following: a full cache, a partial cache, a prefetch mode, a bypass cache during data write, or a cache clearance mechanism. For example, the cache policy may include: writing specific data to be read by an application to a level-1 cache with a fastest read/write speed in advance, to improve efficiency of reading data by the application; or for a request initiated by an application for writing data only to a storage device, directly writing data to storage space of the storage device in a bypass or passthrough manner without using a cache, to reduce space occupation of the cache and improve cache utilization.

In some possible implementations, the storage policy for the application further includes a hierarchical storage policy, and the hierarchical storage policy is used to store data with different frequencies accessed by the application in storage media with different read/write speeds. For example, the hierarchical storage policy may include storing frequently accessed data, that is, data with a high access frequency, in a storage medium with a high read/write speed, for example, a storage class memory (SCM) or an SSD. This can improve efficiency of accessing the data, and can avoid resource usage and waste caused by copying the data in different storage media.

In some possible implementations, the storage policy for the application further includes a redundancy policy, and the redundancy policy is used to determine a backup manner and/or a backup amount of data to be written to the storage system by the application. For example, the redundancy policy may include disposable data does not need to be backed up; and data that needs to be read subsequently needs to be backed up.

In some possible implementations, a reference policy is pre-stored, and the method further includes formulating the storage policy for the application with reference to the reference policy.

Optionally, the reference policy is a policy stored in a policy information base. The policy information base may be stored in the storage system, or may be an independent database, for example, an independent database device.

Optionally, the method may further include first obtaining a policy for the application that has been stored in the policy information base, and determining the storage policy for the application with reference to the information about the application obtained this time.

If the policy information base does not store the storage policy for the application, reference may be made to a storage policy for an application similar to the application in the policy information base. For example, the storage policy for the application may be determined based on a type or a job parameter of the application, and with reference to a storage policy for an application that is recorded in the policy information base and whose type or job parameter is the same as the type or the job parameter of the application, or with reference to a storage policy for an application whose type or job parameter is similar to the type or the job parameter of the application.

Generally, a read/write mode of an application is relatively fixed. Therefore, the storage policy for the application is determined with reference to the storage policy in the policy information base, and a repeated policy does not need to be determined for same content each time. This can improve efficiency of determining a policy, and reduce usage of resources such as a central processing unit (CPU) caused by determining a corresponding policy.

In some possible implementations, the method further includes storing the storage policy for the application.

Optionally, the storage policy for the application may be stored in the policy information base.

Optionally, after the policy for the application is determined, the storage policy may be stored in the policy information base. When the storage policy is stored in the policy information base, the storage policy may be stored in an update manner, that is, information about a changed storage policy is stored in the policy information base.

In some possible implementations, the information about the application is information obtained after normalization is performed based on a preset format and/or preset content. Optionally, normalizing the information about the application based on the preset format includes but is not limited to processing the information about the application based on a unified expression manner or arrangement order. Normalizing the information about the application based on the preset content includes but is not limited to adding additional information, for example, adding context information. The context information includes but is not limited to context information such as an identifier of a node on which the application is located, a name of the node on which the application is located, an IP address of the node on which the application is located, a name of the application, an application parameter, or a job description.

The information about the application is normalized, so that unified storage of information about different applications can be simplified, a manner of storing the information about the application can be simplified, and storage and transmission efficiency of the information about the application can be improved. In addition, when a policy is determined based on the information about the application, the information about the application can be quickly identified and a related policy decision can be made, to improve efficiency of determining a specific policy.

In some possible implementations, the executing the storage policy includes executing a part of the storage policy before the application initiates a read/write request. For example, when the hierarchical storage policy is determined for the application, the policy may be executed after being received. In this way, when the application initiates a related read/write request, related data can be quickly obtained, and utilization of a hierarchical storage medium can be improved. After the hierarchical storage policy is determined for the application, when a data read request of the application is received, data that needs to be read is cached in a corresponding medium based on specific data corresponding to the read request. This can improve a hit rate of cached data and improve data read/write efficiency.

In some possible implementations, the storage policy executed before the application initiates the read/write request includes the hierarchical storage policy. The hierarchical storage policy is used to store, in advance, data to be read by the application in a storage medium with a high read/write speed.

In some possible implementations, the method further includes obtaining the information about the application from the application through an extended interface; or obtaining formatted information of the application from a computing device on which the application runs.

In some possible implementations, the obtaining the information about the application from the application through an extended interface includes one of the following manners: obtaining the information about the application through an extended interface repository; obtaining the information about the application through a dedicated file, where the application or a scheduler corresponding to the application writes the information about the application to the dedicated file; obtaining the information about the application through remote procedure call; or obtaining the information about the application through representational state transfer (RESTful).

According to a second aspect, an embodiment of the present disclosure provides a computer device, including a processor and a memory. The memory stores a computer-readable execution program, and the processor is configured to read the computer-readable execution program to perform the following steps: obtaining information about an application, where the information about the application includes at least one of the following information: I/O operation information of the application, running information of the application, and process information of the application, where data of the application is stored in a storage system, and the storage system includes at least one storage node; formulating a storage policy for the application based on the information about the application; and executing the storage policy.

The computer device can formulate and execute the storage policy for the application based on the information about the application, so that storage of data read and written by the application in the storage system can be optimized and/or access efficiency can be improved. Compared with the conventional technology in which a policy applicable to all applications is configured in a preset manner, in this method, the computer device can formulate different policies for different applications, to effectively improve compatibility of data storage and data read/write for different applications.

Optionally, the storage node may be a server or a computer device that includes a storage resource. The storage resource may include a storage resource such as a memory, an SSD, an HDD, or a magnetic tape.

Optionally, the I/O operation information of the application includes but is not limited to at least one of the following information: a size of data of an I/O operation performed by the application, a location of the data of the I/O operation performed by the application in the storage system, a manner in which the application performs the I/O operation, an identifier of the I/O operation performed by the application, a type of the I/O operation performed by the application, an I/O mode (sequential, stride, random, read-only, write-only, mixed read/write, and the like) of data accessed by each process in the application, a type of the data of the I/O operation performed by the application, duration of the I/O operation performed by the application, a life cycle of the data of the I/O operation performed by the application, a redundancy policy for the data of the I/O operation performed by the application, shared information of the data of the I/O operation performed by the application, or the like.

Optionally, the running information of the application includes but is not limited to at least one of the following information: an identifier of a node on which the application runs, a name of the node on which the application runs, an IP address of the node on which the application runs, a name of a node on which the data of the I/O operation performed by the application is located, an identifier of the node on which the data of the I/O operation performed by the application is located, or the like.

Optionally, the information about the process for executing the application includes but is not limited to at least one of the following information: an identifier of a job for executing the application, a feature of the job for executing the application, an identifier of the process for executing the application, information about specific data processed by the application in a specific process on a specific node, or the like. The job for executing the application may include one or more processes.

In some possible implementations, the processor is further configured to read the computer-readable execution program to perform the following step: formulating the storage policy for the application before the application runs or when a data processing request of the application is received.

In some possible implementations, the processor is further configured to read the computer-readable execution program to perform the following steps: obtaining feature information of the storage system; and formulating the storage policy for the application based on the information about the application and the feature information of the storage system.

In some possible implementations, the feature information of the storage system includes at least one of the following information: a hardware structure of the storage system, hardware components of the storage system, a storage capacity of the storage system, or a data layout of the storage system.

The hardware structure of the storage system is a location relationship or a connection relationship between different components in the storage system, and the hardware components of the storage system are physical forms of the different components in the storage system. For example, the hardware components of the storage system may include an SSD and an HDD. The hardware structure of the storage system indicates that the SSD is a level-2 resource, the HDD is a level-3 resource, and a connection relationship exists between the SSD and the HDD.

In some possible implementations, the storage policy for the application includes a data layout policy, and the data layout policy is used to determine a storage manner and/or a storage location of data written by the application to the storage system.

In some possible implementations, the storage manner of data written by the application to the storage system includes at least one of the following information: a structure type of data that needs to be stored by the application, a quantity of copies of the data that needs to be stored by the application, or a parity mode of the data that needs to be stored by the application.

For example, the data layout policy may include allocating continuous storage space to data to be written to a storage device by an application, to improve data write efficiency; or may be determining whether the to-be-written data is stored in a single copy or a plurality of copies, or may be determining EC or a RAID of the to-be-written data.

In some possible implementations, the storage policy for the application includes a cache policy, the cache policy is used to determine data read by the application from the storage system and a cache mode of the read data, and the cache mode of the data includes at least one of the following: a full cache, a partial cache, a prefetch mode, a bypass cache during data write, or a cache clearance mechanism. For example, the cache policy may include: writing specific data to be read by an application to a level-1 cache with a fastest read/write speed in advance, to improve efficiency of reading data by the application; or for a request initiated by an application for writing data only to a storage device, directly writing data to storage space of the storage device in a bypass or passthrough manner without using a cache, to reduce space occupation of the cache and improve cache utilization.

In some possible implementations, the storage policy for the application further includes a hierarchical storage policy, and the hierarchical storage policy is used to store data with different frequencies accessed by the application in storage media with different read/write speeds. For example, the hierarchical storage policy may include storing frequently accessed data, that is, data with a high access frequency, in a storage medium with a high read/write speed, for example, an SCM or an SSD. This can improve efficiency of accessing the data, and can avoid resource usage and waste caused by copying the data in different storage media.

In some possible implementations, the storage policy for the application further includes a redundancy policy, and the redundancy policy is used to determine a backup manner and/or a backup amount of data to be written to the storage system by the application. For example, the redundancy policy may include disposable data does not need to be backed up; and data that needs to be read subsequently needs to be backed up.

In some possible implementations, a reference policy is pre-stored, and the processor is further configured to read the computer-readable execution program to perform the following step: formulating the storage policy for the application with reference to the reference policy.

Optionally, the processor is further configured to read the computer-readable execution program to perform the following steps: first obtaining a policy for the application that has been stored in the policy information base, and determining the storage policy for the application with reference to the information about the application obtained this time.

If the policy information base does not store the storage policy for the application, reference may be made to a storage policy for an application similar to the application in the policy information base. For example, the storage policy for the application may be determined based on a type or a job parameter of the application, and with reference to a storage policy for an application that is recorded in the policy information base and whose type or job parameter is the same as the type or the job parameter of the application, or with reference to a storage policy for an application whose type or job parameter is similar to the type or the job parameter of the application.

Generally, a read/write mode of an application is relatively fixed. Therefore, the storage policy for the application is determined with reference to the storage policy in the policy information base, and a repeated policy does not need to be determined for same content each time. This can improve efficiency of determining a policy, and reduce usage of resources such as a CPU caused by determining a corresponding policy.

In some possible implementations, the processor is further configured to read the computer-readable execution program to perform the following step: storing the storage policy for the application.

Optionally, the processor may store the storage policy for the application in the policy information base.

Optionally, after determining the policy for the application, the processor may store the storage policy in the policy information base. When the storage policy is stored in the policy information base, the storage policy may be stored in an update manner, that is, information about a changed storage policy is stored in the policy information base.

In some possible implementations, the information about the application is information obtained after normalization is performed based on a preset format and/or preset content. Optionally, normalizing the information about the application based on the preset format includes but is not limited to processing the information about the application based on a unified expression manner or arrangement order. Normalizing the information about the application based on the preset content includes but is not limited to adding additional information, for example, adding context information. The context information includes but is not limited to: context information such as an identifier of a node on which the application is located, a name of the node on which the application is located, an IP address of the node on which the application is located, a name of the application, an application parameter, or a job description.

The information about the application is normalized, so that unified storage of information about different applications can be simplified, a manner of storing the information about the application can be simplified, and storage and transmission efficiency of the information about the application can be improved. In addition, when a policy is determined based on the information about the application, the information about the application can be quickly identified and a related policy decision can be made, to improve efficiency of determining a specific policy.

In some possible implementations, that the processor reads the computer-readable execution program to execute the storage policy includes: before the application initiates a read/write request, the processor reads the computer-readable execution program to execute a part of the storage policy. For example, when the hierarchical storage policy is determined for the application, the policy may be executed after being received. In this way, when the application initiates a related read/write request, related data can be quickly obtained, and utilization of the hierarchical storage medium can be improved. After the hierarchical storage policy is determined for the application, when a data read request of the application is received, data that needs to be read is cached in a corresponding medium based on specific data corresponding to the read request. This can improve a hit rate of cached data and improve data read/write efficiency.

In some possible implementations, the part of the storage policy includes the hierarchical storage policy. The hierarchical storage policy is used to store, in advance, data to be read by the application in a storage medium with a high read/write speed.

In some possible implementations, the storage system further includes at least one computing node, the application runs on the at least one computing node, data read and written by the application is stored on the at least one storage node, and the at least one storage node includes the computer device.

In some possible implementations, the processor obtains the information about the application from the application through an extended interface; or the processor obtains formatted information of the application from a computing node on which the application runs.

In some possible implementations, the at least one storage node includes the computer device, and each storage node includes a storage resource and a computing resource.

That the processor obtains the information about the application includes:

The processor obtains the information about the application through the extended interface.

In some possible implementations, that the processor obtains the information about the application from the application through an extended interface includes one of the following manners: the processor obtains the information about the application through an extended interface repository; the processor obtains the information about the application through a dedicated file, where the application or a scheduler corresponding to the application writes the information about the application to the dedicated file; the processor obtains the information about the application through remote procedure call; or the processor obtains the information about the application through RESTful.

According to a third aspect, an embodiment of the present disclosure provides a data management system. The data management system includes an application awareness module, a policy determining module, and a policy execution module.

The application awareness module is configured to obtain information about an application. The information about the application includes at least one of the following information: I/O operation information of the application, running information of the application, and process information of the application. Data of the application is stored in a storage system, and the storage system includes at least one storage node.

The policy determining module is configured to formulate a storage policy for the application based on the information.

The policy execution module is configured to execute the policy.

The data management system can formulate and execute the storage policy for the application based on the information about the application, so that storage of data read and written by the application in the storage system can be optimized and/or access efficiency can be improved. Compared with the conventional technology in which a policy applicable to all applications is configured in a preset manner, in this method, a computer device can formulate different policies for different applications, to effectively improve compatibility of data storage and data read/write for different applications.

In some possible implementations, the policy determining module formulates the storage policy for the application before the application runs or when a data processing request of the application is received.

In some possible implementations, the policy determining module is further configured to: obtain feature information of the storage system, and formulate the storage policy for the application based on the information about the application and the feature information of the storage system.

In some possible implementations, the feature information of the storage system includes at least one of the following information: a hardware structure of the storage system, hardware components of the storage system, a storage capacity of the storage system, or a data layout of the storage system.

In some possible implementations, the storage policy for the application includes a data layout policy, and the data layout policy is used to determine a storage manner and/or a storage location of data written by the application to the storage system.

In some possible implementations, the storage manner of data written by the application to the storage system includes at least one of the following information: a structure type of data that needs to be stored by the application, a quantity of copies of the data that needs to be stored by the application, or a parity mode of the data that needs to be stored by the application.

In some possible implementations, the storage policy for the application includes a cache policy, the cache policy is used to determine data read by the application from the storage system and a cache mode of the read data, and the cache mode of the data includes at least one of the following: a full cache, a partial cache, a prefetch mode, a bypass cache during data write, or a cache clearance mechanism.

In some possible implementations, the storage policy for the application further includes a hierarchical storage policy, and the hierarchical storage policy is used to store data with different frequencies accessed by the application in storage media with different read/write speeds.

In some possible implementations, the storage policy for the application further includes a redundancy policy, and the redundancy policy is used to determine a backup manner and/or a backup amount of data to be written to the storage system by the application.

In some possible implementations, the policy determining module is further configured to formulate the storage policy for the application with reference to a pre-stored reference policy.

In some possible implementations, the information about the application is information obtained after normalization is performed based on a preset format and/or preset content.

In some possible implementations, the executing the storage policy includes executing a part of the storage policy before the application initiates a read/write request.

In some possible implementations, the policy determining module is further configured to obtain the information about the application from the application through an extended interface; or obtain formatted information of the application from a computing device on which the application runs.

In some possible implementations, that the policy determining module obtains the information about the application from the application through an extended interface includes one of the following manners: obtaining the information about the application through an extended interface repository; obtaining the information about the application through a dedicated file, where the application or a scheduler corresponding to the application writes the information about the application to the dedicated file; obtaining the information about the application through remote procedure call; or obtaining the information about the application through RESTful.

According to a fourth aspect, the present disclosure provides a chip. The chip is configured to perform the steps of the method in the first aspect. Alternatively, the chip is configured to implement content that needs to be executed by the processor in the second aspect, or one or more of functions of the application awareness module, the policy determining module, and the policy execution module in the third aspect. Optionally, the chip includes a processor and a chip interface. The processor may be a CPU, a microprocessor, an application-specific integrated circuit (ASIC), a field-programmable gate array (FPGA), or the like.

According to a fifth aspect, the present disclosure provides a computer-readable storage medium. The computer-readable storage medium stores instructions, and the instructions instruct a computer device to perform the method according to the first aspect.

According to a sixth aspect, the present disclosure provides a computer program product including instructions. When the computer program product runs on a computer device, the computer device is enabled to perform the method according to the first aspect.

In the present disclosure, on the basis of the implementations according to the foregoing aspects, the implementations may be further combined to provide more implementations.

BRIEF DESCRIPTION OF DRAWINGS

The following briefly describes the accompanying drawings for describing embodiments. It is clearly that the accompanying drawings in the following description show merely some embodiments of the present disclosure, and a person of ordinary skill in the art may derive other drawings from these accompanying drawings without creative efforts.

DESCRIPTION OF EMBODIMENTS

Figure 1:
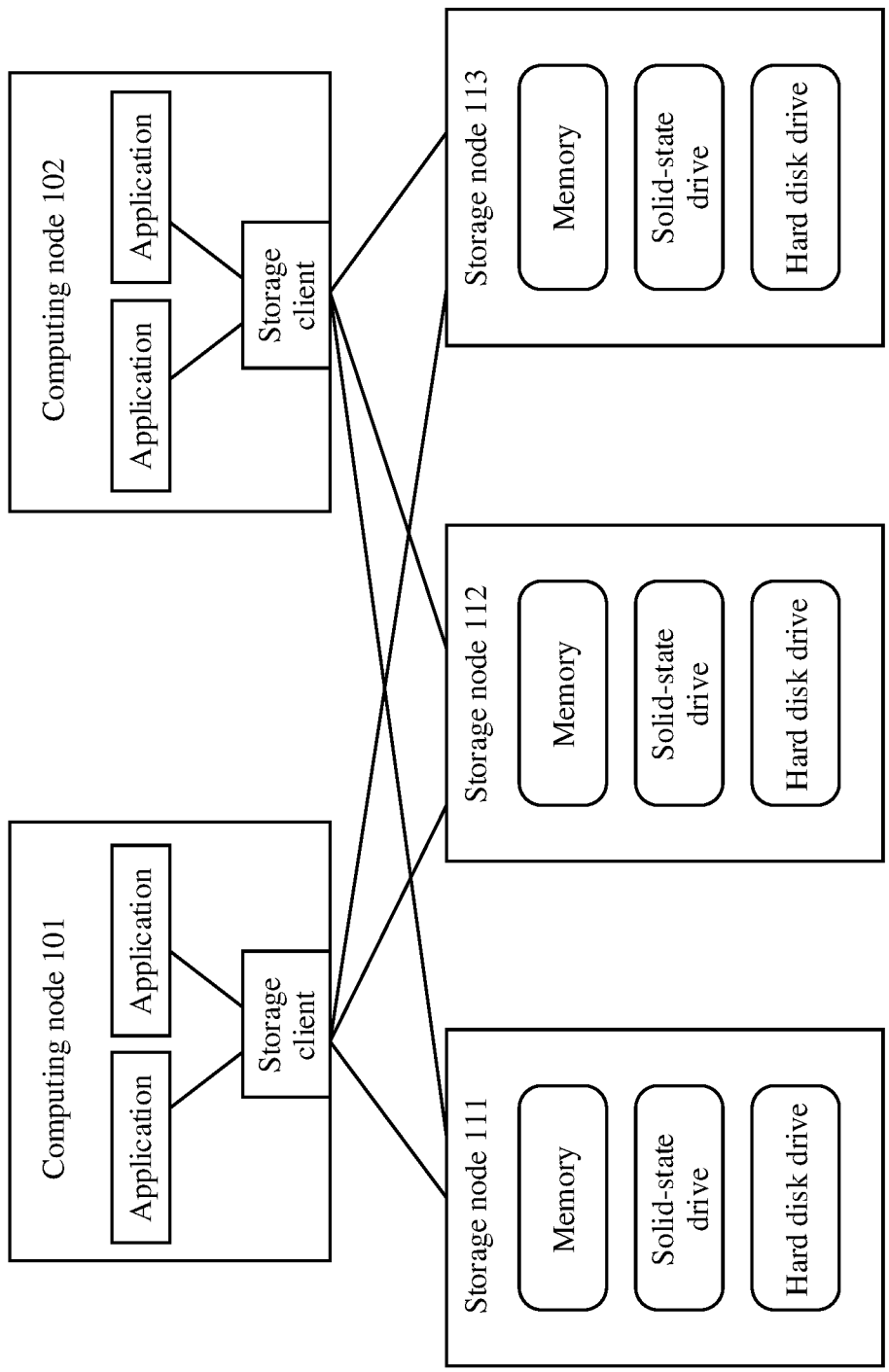
FIG. 1 is a schematic diagram of a structure of a storage system according to an embodiment of the present disclosure.

The following describes embodiments of the present disclosure with reference to accompanying drawings.

In the specification, claims, and accompanying drawings of the present disclosure, the terms "first", "second", and the like are intended to distinguish between similar objects but do not necessarily indicate a specific order or sequence. It should be understood that the data termed in such a way are interchangeable in proper circumstances so that embodiments described herein can be implemented in an order other than the order illustrated or described herein. In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features.

In the specification and claims of the present disclosure, the terms "include", "contain" and any other variants mean to cover a non-exclusive inclusion, for example, a process, method, system, product, or device that includes a series of steps or modules is not necessarily limited to those expressly listed steps or modules, but may include other steps or modules not expressly listed or inherent to such a process, method, product, or device. The naming or numbering of the steps appearing in the present disclosure does not mean that the steps in the method procedures need to be performed in a time/logical order indicated by the naming or numbering. An execution order of the steps in the procedures that have been named or numbered can be changed according to the technical objective to be achieved, provided that same or similar technical effects can be achieved. Division into units in the present disclosure is logical division and may be other division in an actual implementation. For example, a plurality of units may be combined or integrated into another system, or some features may be ignored or not performed. In addition, the displayed or discussed mutual couplings or direct couplings or communication connections may be implemented through some interfaces. The indirect couplings or communication connections between the units may be implemented in electronic or other similar forms. This is not limited in the present disclosure. In addition, units or subunits described as separate parts may or may not be physically separate, may or may not be physical units, or may be distributed into a plurality of circuit units. Some or all of the units may be selected based on actual requirements to achieve the objectives of the solutions of the present disclosure.

It should be understood that the terms used in the descriptions of the various examples in the specification and claims of the present disclosure are merely intended to describe specific examples, but are not intended to limit the examples. The terms "one" ("a" and "an") and "the" of singular forms used in the descriptions of various examples and the appended claims are also intended to include plural forms, unless otherwise specified in the context clearly.

It should also be understood that the term "and/or" used in the specification and claims of the present disclosure indicates and includes any or all possible combinations of one or more items in associated listed items. The term "and/or" describes an association relationship between associated objects and represents that three relationships may exist. For example, A and/or B may represent the following three cases: Only A exists, both A and B exist, and only B exists. In addition, the character "/" in the present disclosure generally indicates an "or" relationship between associated objects.

It should be understood that determining B based on A does not mean that B is determined based on only A, but B may alternatively be determined based on A and/or other information.

It should be further understood that when being used in this specification, the term "include" (also referred to as "includes", "including", "comprises", and/or "comprising") specifies presence of stated features, integers, steps, operations, elements, and/or components, but does not preclude presence or addition of one or more other features, integers, steps, operations, elements, components, and/or groups thereof.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that", "in response to determining", "when (a stated condition or event) is detected", or "in response to detecting (a stated condition or event)".

It should be understood that "one embodiment", "an embodiment", and "a possible implementation" mentioned in the entire specification mean that particular features, structures, or characteristics related to the embodiment or the implementation are included in at least one embodiment of the present disclosure. Therefore, "in one embodiment", "in an embodiment", or "in a possible implementation" appearing throughout this specification does not necessarily mean a same embodiment. In addition, these particular features, structures, or characteristics may be combined in one or more embodiments by using any appropriate manner.

In embodiments of the present disclosure, an application is a program or a service that implements a specific function by using an electronic device such as a computer, a mobile phone, a network, or a cloud service or in an electronic manner. For example, the application may be an Office application (such as a Word® tool), a video application (such as Youku®, iQIYI®, and Facebook®), or a social application (such as WeChat® and Weibo®). A specific form and a presentation form of the application are not limited in embodiments of the present disclosure. Any program or tool that can implement data read and write, or software that implements a same or similar function falls within the scope disclosed in embodiments of the present disclosure.

A storage system is a system configured to store a program and/or data. The system may include at least one storage node and a control component. A program of the application may be stored in the storage system, and a computer device runs the application by reading the program in the storage system. It should be noted that the storage system may be integrated into the computer device, or may be independent of the computer device. When the storage system is independent of the computer device, all computer devices in a cluster may share the storage system, to form a cluster storage system.

Considering requirements for read/write performance, a capacity, and costs, a storage system may generally be configured with multi-level storage devices. Specifically, a cache, a main memory (also referred to as an internal memory, memory for short), and a secondary memory (also referred to as an external memory) may be configured in the storage system.

The storage system provides different storage resources by using the foregoing memories. Specifically, the memory may be directly accessed by a processor of the computer device, directly provides data and instructions for the processor, and stores data processed by the processor. The memory has a high read/write speed but a relatively small capacity. The external memory cannot be directly accessed by the processor. Therefore, the external memory is mainly used to store data and programs that are not used by the processor temporarily. A read/write speed of the external memory is lower than that of the memory, but a capacity of the external memory is larger. The cache is located between the processor and the memory, and is configured to resolve a problem that an operation speed of the processor does not match the read/write speed of the memory. Specifically, data to be accessed by the processor is stored in the cache, and the data belongs to a part of data in the memory.

Many existing distributed storage systems have "hierarchical storage" or "Cache". A main function of the distributed storage system is to store data (or referred to as hot data) that is being used or to be used in the system in a medium with a higher read/write speed, and store rarely used data (or referred to as cold data) in a medium with a lower read/write speed.

In essence, in a hierarchical storage technology or Cache technology, access of an application for data is "blindly" detected and cold and hot data changes are roughly predicted, which is "speculative" or "random" to a large extent, and it is difficult to accurately predict cold and hot changes of all data. If an algorithm is not good, the hot data may be stored in the medium with a lower read/write speed, and the cold data may be written to the medium with a higher read/write speed. For the hot data stored in the medium with a lower read/write speed, read/write efficiency of the hot data is low. In addition, the medium with a higher read/write speed usually has higher costs, and the cold data occupies space of the medium with a higher read/write speed, resulting in an increase in costs.

In addition, in the distributed storage system, to improve a system throughput rate, file data is divided into blocks of a same size, and the blocks are stored on different storage nodes. In this way, bandwidth of a plurality of nodes and a plurality of storage devices can be fully utilized. In addition, a plurality of redundancy policies such as EC and multi-copy can be constructed on the basis, to ensure data reliability. This default data fragment mode is not suitable for a mode of using data by the application in some scenarios. For example, when a default fragment policy is allocating a fragment to each file, if an application that accesses (reads/writes) the file runs on a plurality of nodes, especially when applications on a plurality of nodes need to write the file, file I/O bandwidth cannot be ensured, and many I/O conflicts occur. This severely slows down a read/write progress of each application and affects read/write efficiency of the application.

In the foregoing implementation, because the storage system is unaware of an I/O mode of an application, a proper data layout cannot be selected or an accurate cache policy cannot be formulated for I/O modes of different applications. This affects effective management of stored data and application access efficiency.

Embodiments of the present disclosure provide a data management method in a storage system, so that the storage system can sense information such as an I/O mode of an application, select a proper data layout policy and the like based on the I/O mode of the application, and use a differentiated cache policy and/or a hierarchical storage solution, to improve performance of the storage system and improve efficiency of accessing such as reading and writing data by the application.

FIG. 1 is a schematic diagram of a structure of a storage system according to an embodiment of the present disclosure. As shown in FIG. 1, the storage system includes two parts: storage nodes and storage clients. In FIG. 1, an example in which a storage node 111, a storage node 112, and a storage node 113 are included, and a storage client separately runs on a computing node 101 and a computing node 102 is used for description.

A plurality of storage nodes form a storage backend, and the storage backend is formed by media with different bandwidths or characteristics, for example, may be formed by a memory, an SCM, an SSD, an HDD, or a magnetic tape. In FIG. 1, an example in which a storage node includes a memory, an SSD, and an HDD is used for description.

Storage media with different characteristics on the storage node form a storage pool of a plurality of tiers, which is also referred to as hierarchical storage management (HSM). Generally, frequently accessed data and recently used data are stored in a faster tier (e.g., a medium of a memory or an SSD tier), and less frequently accessed data is stored in a slow tier (e.g., a medium of an HDD or a tape tier). For example, in FIG. 1, memories in at least two storage nodes may form a memory pool of the storage system, SSDs in the at least two storage nodes may form a flash memory pool of the storage system, and HDDs in the at least two storage nodes may form a hard disk pool of the storage system, to form different levels of storage media for storing data with different access frequencies.

The storage client is an interface between a computing node and a storage node, and is configured to receive an I/O request initiated by an application, and implement interaction between the computing node and the storage node. In FIG. 1, an example in which the storage client runs on the computing node is used for description. Many different applications may run on each computing node, and different applications may be connected to the storage system through a same storage client. In FIG. 1, an example in which two applications run on each computing node is used for description.

It should be noted that FIG. 1 merely shows an example of composition of a storage node and a computing node and a connection relationship between the storage node and the computing node. During specific implementation, the storage nodes (the storage node 111, the storage node 112, and the storage node 113) may further include hardware resources such as a processor and a bus, and related software or software modules for implementing data read/write control by using the processor or the like. The computing nodes (the computing node 101 and the computing node 102) may further include hardware components such as a processor, a memory, and a bus. An application and a storage client in each computing node may implement corresponding functions by using the processor or the like.

Figure 2:
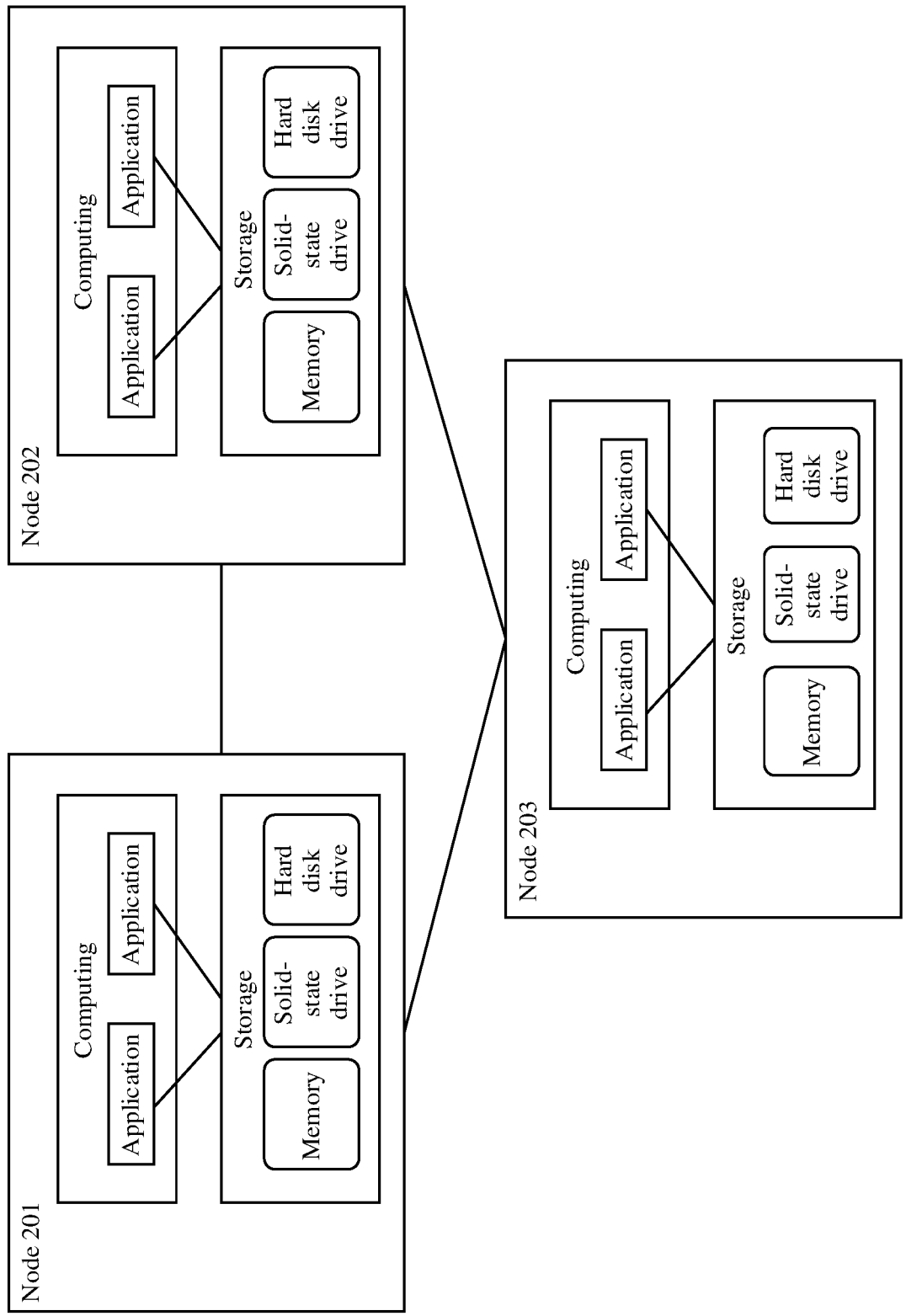
FIG. 2 is a schematic diagram of a structure of another storage system according to an embodiment of the present disclosure.

FIG. 2 is a schematic diagram of a structure of another storage system according to an embodiment of the present disclosure. A scenario shown in FIG. 2 is an implementation scenario of a hyper-converged infrastructure (HCI). In the HCI scenario, computing and storage coexist on each HCI node. For example, a node 201 includes two parts: a computing part and a storage part. The computing part includes applications. The storage part includes storage media such as a memory, an SSD, and an HDD. The applications in the computing part are connected to the storage part in the node and implement data read and write. Applications on different nodes may also access data stored on another node.

It should be noted that, only for ease of description, each node in FIG. 2 shows only a part of composition. During specific implementation, the computing part of each node may further include a hardware resource such as a processor, and the storage part may further include a hardware resource such as a bus, a software resource for implementing data read/write control, and the like.

The scenarios shown in FIG. 1 and FIG. 2 are merely examples, and should not be used as limitations on embodiments of the present disclosure. During specific implementation, the storage system may also be implemented in another similar scenario. For example, embodiments of the present disclosure is also applicable to a distributed storage system, including but not limited to a distributed file storage system, a distributed block storage system, or a distributed object storage system; or is applicable to a system such as cloud storage or a platform as a service (PaaS) layer of a public cloud. In an optional implementation, the solution provided in embodiments of the present disclosure is more suitable for a storage system with a relatively large quantity of applications or a storage system applicable to an application with a variable I/O mode.

Figure 3A:
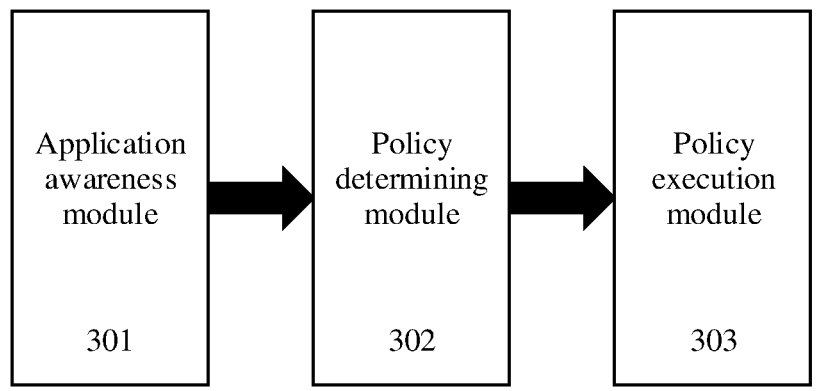
FIG. 3A is a schematic diagram of a logical architecture of software modules for implementing a data management method for an application according to an embodiment of the present disclosure.

FIG. 3A is a schematic logical diagram of software modules for implementing a data management method for an application in a storage system according to an embodiment of the present disclosure. As shown in FIG. 3A, the software modules for implementing this embodiment of the present disclosure include an application awareness module 301, a policy determining module 302, and a policy execution module 303.

The application awareness module 301 is configured to obtain information about an application, including static attribute information and/or dynamic variable information of the application, and provide the obtained information to the policy determining module 302. The information about the application includes but is not limited to one or more of the following information: I/O operation information of the application, running information of the application, and information about a process for executing the application.

The I/O operation information of the application includes but is not limited to at least one of the following information: a size of data of an I/O operation performed by the application, a location of the data of the I/O operation performed by the application in the storage system, a manner in which the application performs the I/O operation, an identifier of the I/O operation performed by the application, a type of the I/O operation performed by the application, an I/O mode (sequential, stride, random, read-only, write-only, mixed read/write, and the like) of data accessed by each process in the application, a type of the data of the I/O operation performed by the application, duration of the I/O operation performed by the application, a life cycle of the data of the I/O operation performed by the application, a redundancy policy for the data of the I/O operation performed by the application, shared information of the data of the I/O operation performed by the application, or the like.

The running information of the application includes but is not limited to at least one of the following information: an identifier of a node on which the application runs, a name of the node on which the application runs, an IP address of the node on which the application runs, a name of a node on which the data of the I/O operation performed by the application is located, an identifier of the node on which the data of the I/O operation performed by the application is located, or the like.

The information about the process for executing the application includes but is not limited to at least one of the following information: an identifier of a job for executing the application, a feature of the job for executing the application, an identifier of the process for executing the application, information about specific data processed by the application in a specific process on a specific node, or the like. The job for executing the application may include one or more processes.

The policy determining module 302 is configured to determine a storage policy for the application based on the information provided by the application awareness module 301.

The storage policy includes but is not limited to a data layout policy, a cache policy, a hierarchical storage policy, a redundancy policy, or the like.

In an implementation, the policy determining module 302 is further configured to store the storage policy for the application in a policy information base. The policy information base is configured to store the storage policy determined by the policy determining module 302 for each application. Correspondingly, when determining a specific policy for the application based on the information provided by the application awareness module 301, the policy determining module 302 may determine a current data management policy with reference to the determined policy in the policy information base and the information about the application received this time. Generally, a read/write mode of an application is relatively fixed. Therefore, the storage policy for the application is determined with reference to the policy in the policy information base, and a repeated policy does not need to be determined for same content each time. This can improve efficiency of determining a storage policy by the policy determining module 302, and reduce usage of resources such as a CPU caused by determining a corresponding policy.

For example, the policy determining module 302 may further store an updated or changed storage policy in the policy information base after determining the storage policy for the application. That is, once the policy determining module 302 completes policy determining, the determined storage policy is sent to the policy information base.

The policy execution module 303 is configured to execute the storage policy determined by the policy determining module 302.

The software modules shown in FIG. 3A may be deployed in different computer devices independently or in combination, to implement corresponding functions. The following uses FIG. 3B to FIG. 3F as examples to describe different implementations of the software modules shown in FIG. 3A in a computer device. It may be understood that FIG. 3B to FIG. 3F are merely examples for description, and during specific implementation, other manners may be alternatively used for implementation.

Figure 3B:
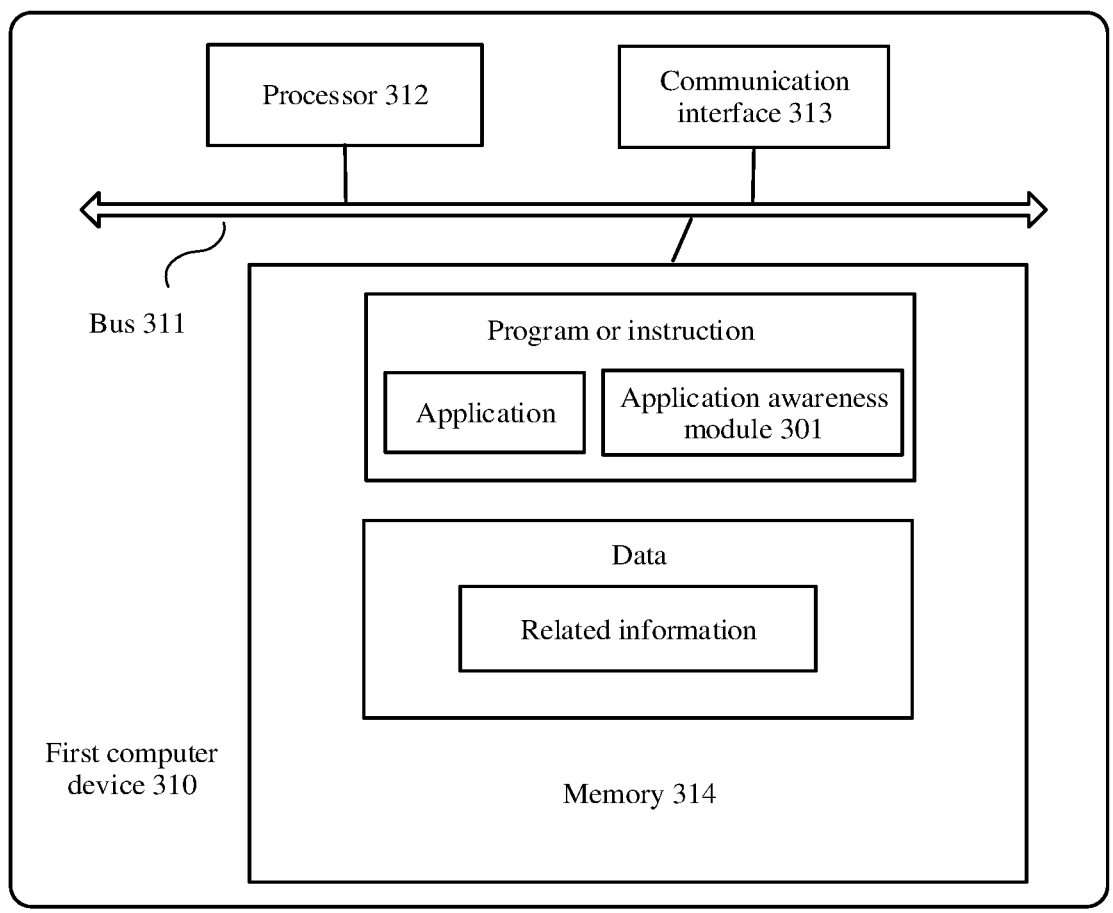
FIG. 3B is a schematic diagram of an application awareness module according to an embodiment of the present disclosure.

As shown in FIG. 3B, a first computer device 310 includes a bus 311, a processor 312, a communication interface 313, and a memory 314. The processor 312, the memory 314, and the communication interface 313 communicate with each other through the bus 311. The bus 311 may be a Peripheral Component Interconnect (PCI) bus, a PCI Express (PCIe) bus, an Extended Industry Standard Architecture (EISA) bus, or the like. The bus may be classified into an address bus, a data bus, a control bus, and the like. For ease of representation, only one thick line is used to represent the bus in FIG. 3B, but this does not mean that there is only one bus or only one type of bus. The communication interface 313 is configured to communicate with the outside, for example, receive operation attribute information and object attribute information of an I/O operation.

The processor 312 may be a chip having a computing capability, such as a CPU, a graphics processing unit (GPU), a general-purpose graphics processing unit (GPGPU), a tensor processing unit (TPU), or a data processing unit (DPU). The memory 314 may include a volatile memory, for example, a random-access memory (RAM). Alternatively, the memory 314 may include a non-volatile memory, for example, a read-only memory (ROM), a flash memory, an HDD, or an SSD.

The memory 314 stores a program or instructions, for example, a program or instructions for implementing a function of the application awareness module 301. The processor 312 executes the program or the instructions to obtain information about an application. Certainly, the memory 314 may further store data, including but not limited to data that needs to be stored by the first computer device 310; or may store the information about the application obtained by the application awareness module 301.

In an implementation, the information about the application stored in the memory 314 may be periodically summarized into a dedicated database. The dedicated database may be an independent database device, and is specially configured to store an application-related database.

Figure 3C:
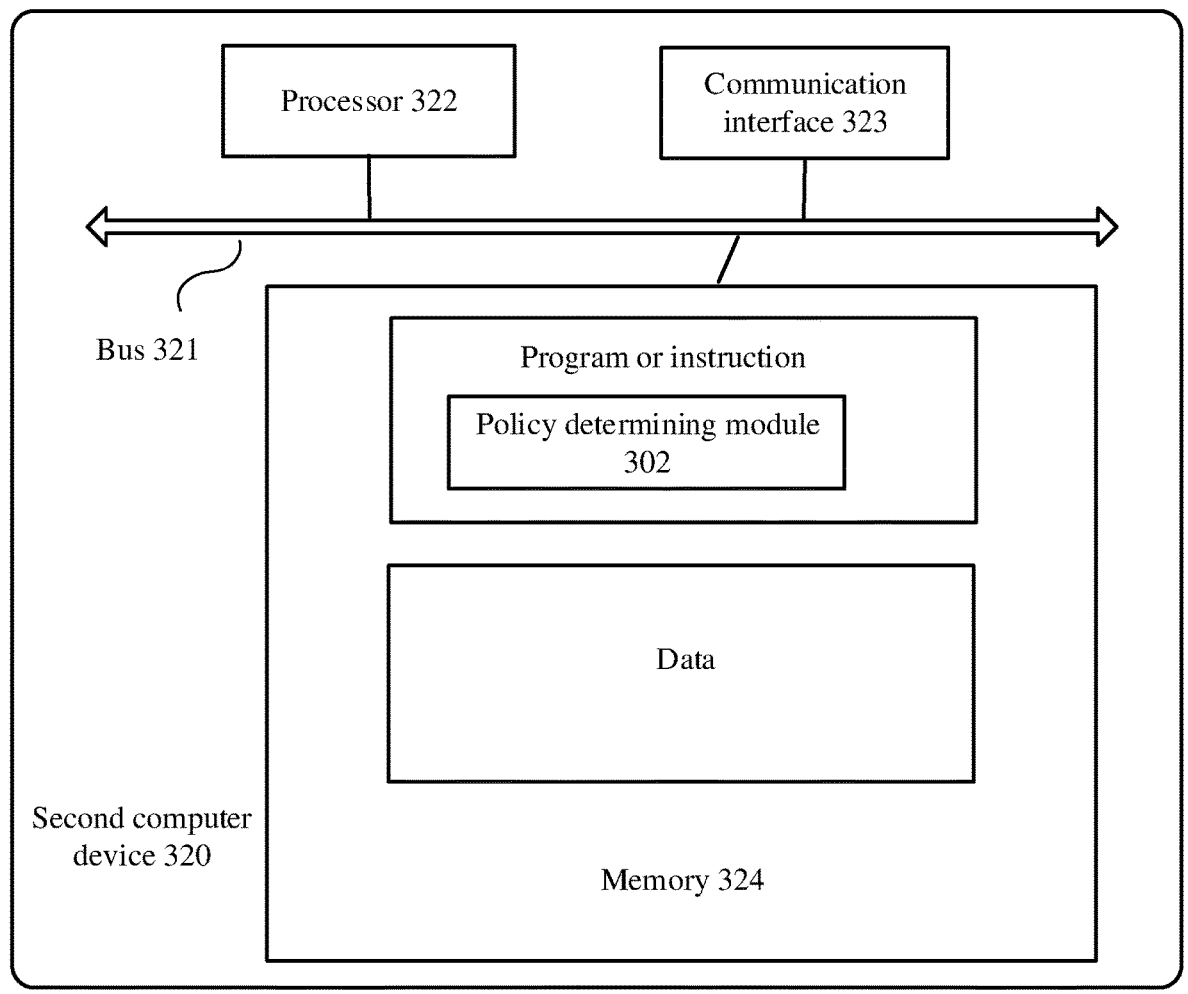
FIG. 3C is a schematic diagram of a policy determining module according to an embodiment of the present disclosure.

As shown in FIG. 3C, a second computer device 320 includes a bus 321, a processor 322, a communication interface 323, and a memory 324. The processor 322, the memory 324, and the communication interface 323 communicate with each other through the bus 321. The memory 324 stores a program or instructions, for example, a program or instructions for implementing a function of the policy determining module 302. Certainly, the memory 324 may further store data, for example, to-be-read/to-be-written data.

Implementations of the processor, the memory, the bus, and the like in FIG. 3C are similar to those in FIG. 3B.

Optionally, the memory 324 in FIG. 3C may further store the foregoing policy information base. The policy determining module 302 may locally obtain, from the second computer device 320, a policy related to the application, and formulate a storage policy for the application with reference to the information about the application obtained this time. The policy determining module 302 may further store the formulated storage policy for the application or an updated storage policy for the application in the policy information base. Certainly, the policy information base in this embodiment of the present disclosure may alternatively be stored in an independent database, for example, an independent computer device configured to store data; or may be stored on different storage nodes in a distributed manner. For example, in the scenario shown in FIG. 1, the policy information base may be stored on any two or three of the storage node 111, the storage node 112, and the storage node 113.

Figure 3D:
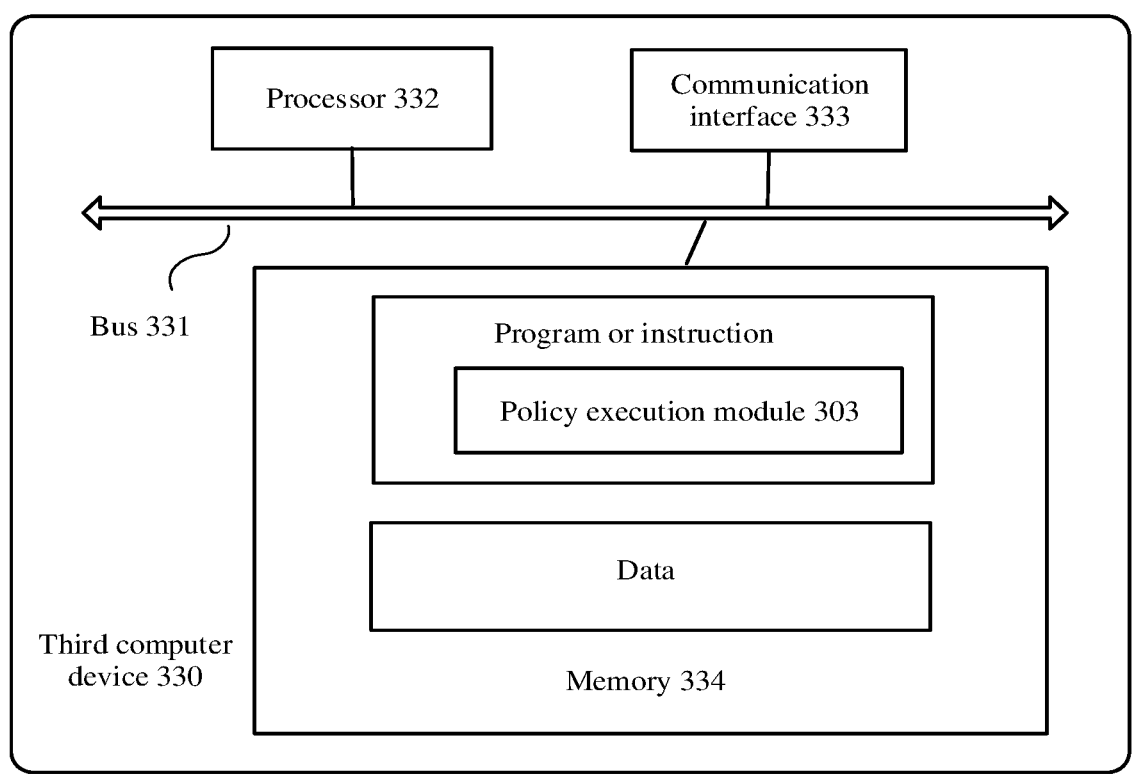
FIG. 3D is a schematic diagram of a policy execution according to an embodiment of the present disclosure.

As shown in FIG. 3D, a third computer device 330 includes a bus 331, a processor 332, a communication interface 333, and a memory 334. The processor 332, the memory 334, and the communication interface 333 communicate with each other through the bus 331. The memory 334 stores a program or instructions, for example, a program or instructions for implementing a function of the policy execution module 303. Certainly, the memory 334 may further store data, for example, to-be-read/to-be-written data.

Implementations of the processor, the memory, the bus, and the like in FIG. 3D are similar to those in FIG. 3B.

Figure 3E:
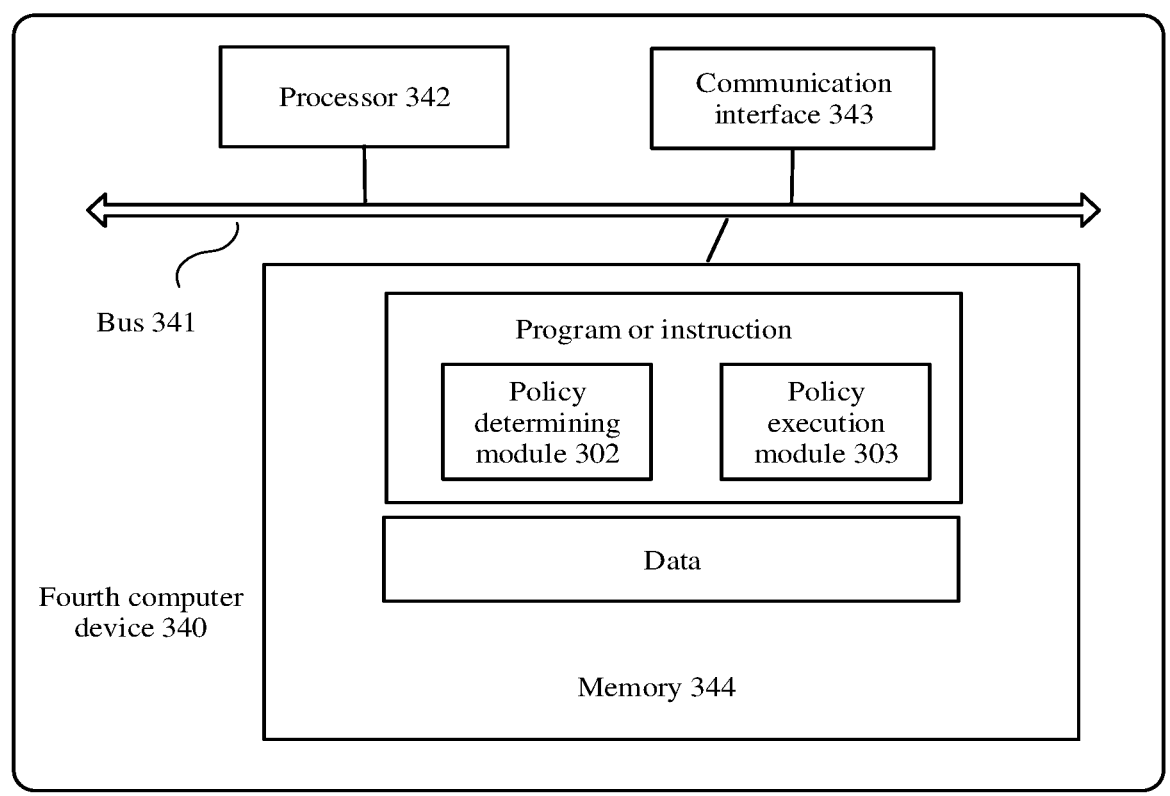
FIG. 3E is a schematic diagram of a policy determining module and a policy execution module according to an embodiment of the present disclosure.

As shown in FIG. 3E, a fourth computer device 340 includes a bus 341, a processor 342, a communication interface 343, and a memory 344. The processor 342, the memory 344, and the communication interface 343 communicate with each other through the bus 341. The memory 344 stores a program or instructions, for example, a program or instructions for implementing a function of the policy determining module 302 and a function of the policy execution module 303. Certainly, the memory 344 may further store data, for example, to-be-read/to-be-written data.

Implementations of the processor, the memory, the bus, and the like in FIG. 3E are similar to those in FIG. 3B.

Figure 3F:
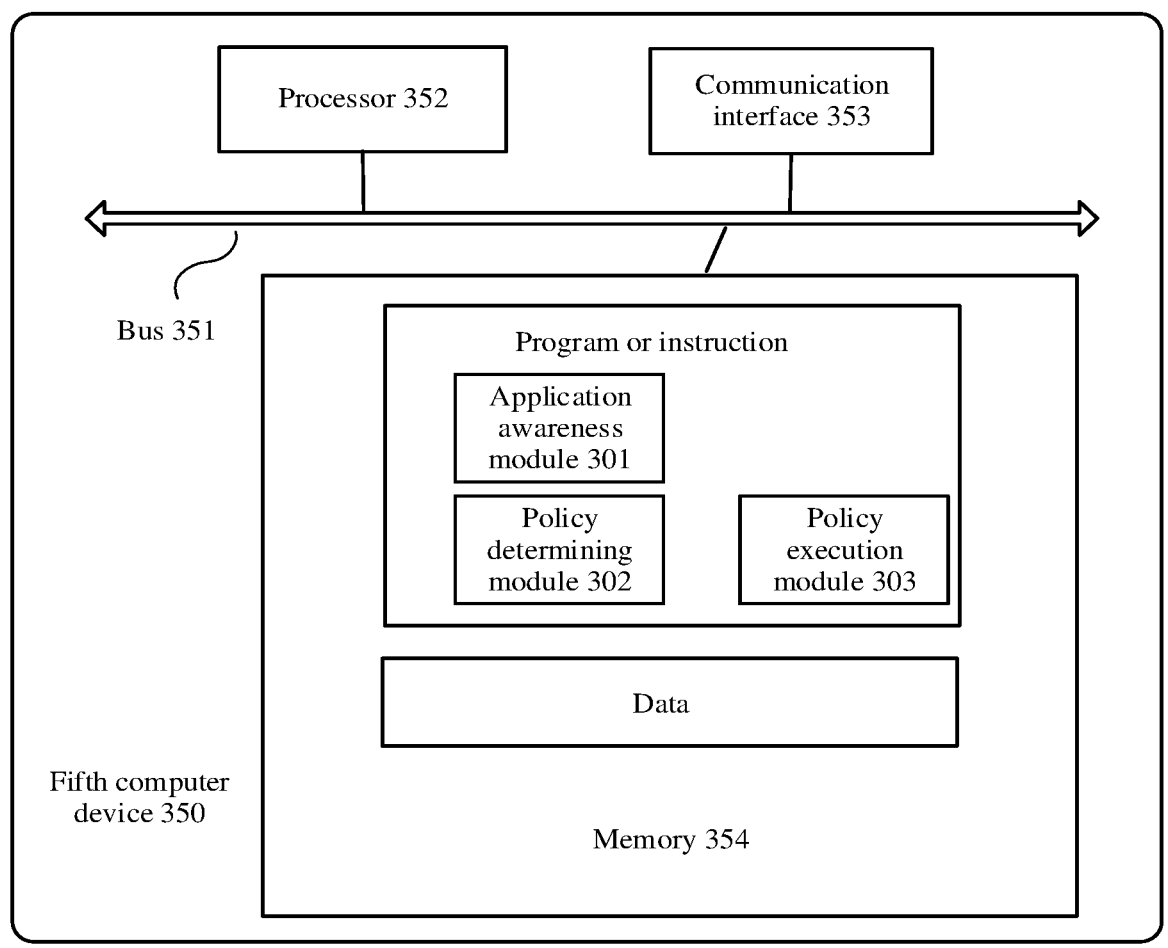
FIG. 3F is a schematic diagram of a an application awareness module, a policy determining module, and a policy execution module according to an embodiment of the present disclosure.

As shown in FIG. 3F, a fifth computer device 350 includes a bus 351, a processor 352, a communication interface 353, and a memory 354. The processor 352, the memory 354, and the communication interface 353 communicate with each other through the bus 351. The memory 354 stores a program or instructions, for example, a program or instructions for implementing a function of the application awareness module 301, a function of the policy determining module 302, and a function of the policy execution module 303. Certainly, the memory 354 may further store data, for example, to-be-read/to-be-written data.

Implementations of the processor, the memory, the bus, and the like in FIG. 3F are similar to those in FIG. 3B.

The computer devices in FIG. 3B to FIG. 3F may be selectively applicable to the scenario shown in FIG. 1 or FIG. 2. For example, the computer device shown in FIG. 3B is applicable to the computing node (e.g., the computing node 101 or 102) in FIG. 1, and the computer device shown in FIG. 3C, FIG. 3D, or FIG. 3E is applicable to the storage node (e.g., the storage node 111, 112, or 113) shown in FIG. 1. The computer device shown in FIG. 3F is applicable to the node (e.g., the node 201, 202, or 203) shown in FIG. 2.

In some possible implementations, functions of the application awareness module 301, the policy determining module 302, and the policy execution module 303 may be further implemented by using one or more chips. Each chip includes a processor and a chip interface. Optionally, the processor may be a CPU, a microprocessor, an ASIC, an FPGA, or the like. The chip interface is configured to receive instructions, and transmit the instructions to the processor. The processor executes the instructions to perform the steps of the data management method. Certainly, when the functions of the application awareness module 301, the policy determining module 302, and the policy execution module 303 are implemented by using a plurality of chips, a chip interface of each chip receives some instructions, and a processor of each chip implements corresponding functions based on some steps of the data management method. In this way, a plurality of processors can implement the steps of the data management method in the storage system according to embodiments of the present disclosure.

The following describes, by using an example in which the scenario shown in FIG. 1 is used, the first computer device shown in FIG. 3B is applicable to the computing node 101 in FIG. 1, and the fourth computer device shown in FIG. 3E is applicable to the storage node 111 in FIG. 1, a data management method for implementing an application in a storage system according to an embodiment of the present disclosure.

Figure 4:
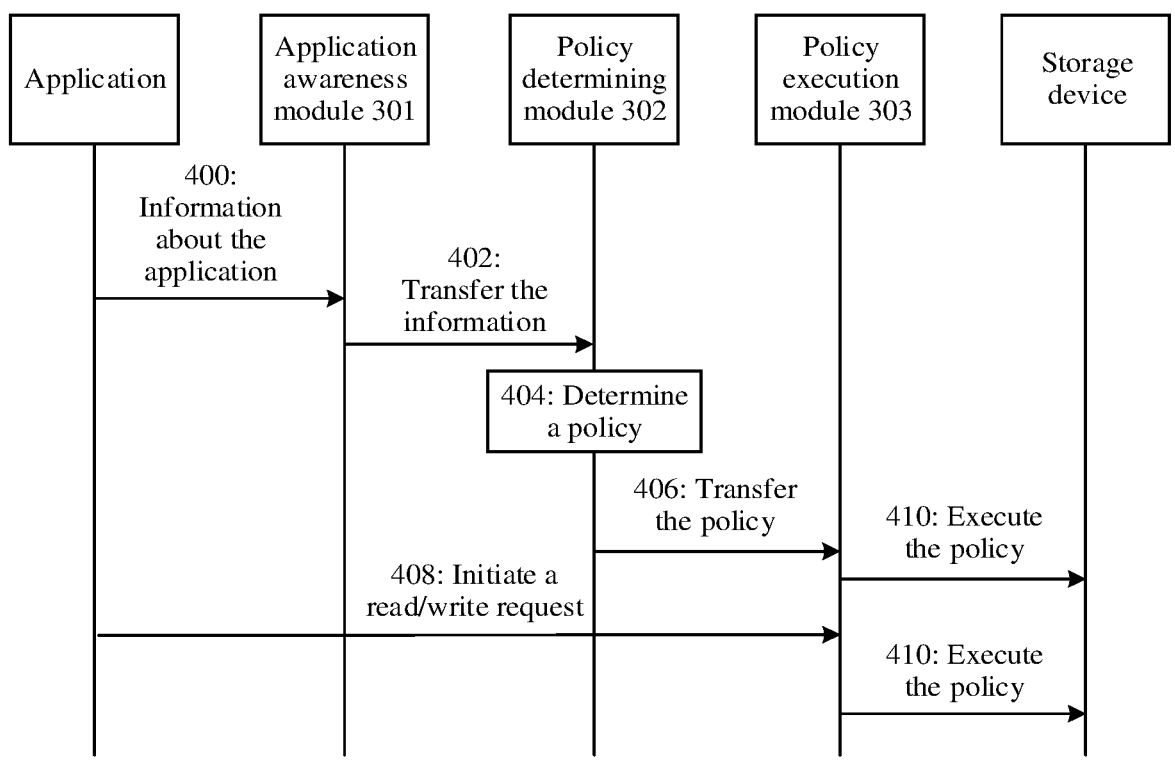
FIG. 4 is a schematic flowchart of a data management method for an application according to an embodiment of the present disclosure.

As shown in FIG. 4, a data management method for an application according to this embodiment of the present disclosure includes the following steps.

Step 400: The application awareness module 301 receives information about the application.

For example, the application awareness module 301 may receive the information from the application through an extended interface.

In an implementation, the application and the application awareness module 301 may implement information transfer through more than one extended interface. The more than one extended interface is an interface added in an extension manner, and is used as an interface for transferring information between the application and the application awareness module 301. These extended interfaces may be more than one different interface, and are different from an existing interface of the application.

During specific implementation, the interface may be extended in the following manner. However, this embodiment of the present disclosure is not limited to the following implementations.

(1) The application awareness module 301 provides a dedicated interface repository to implement interface extension. The interface repository may be an application programming interface (API) repository. The interface repository may be a dynamic link library. When the application is compiled, a link to the dynamic link library is added, and the dynamic link library is linked to an executable file of the application. In this way, when the application runs, the information about the application can be transferred to the application awareness module 301 by invoking the dynamic link library.

This manner is applicable to a scenario in which application code can be modified. That is, information is transferred between the application and the application awareness module 301 through the interface repository by modifying code of the application.

(2) The application awareness module 301 provides a command line tool, and the application may directly invoke the command line tool, to invoke, by using the command line tool, the interface repository provided by the application awareness module 301.

This manner is applicable to a scenario in which application code cannot be modified. For example, the application or a related scheduler invokes the command line tool to invoke the interface repository, to further implement information transfer between the application and the application awareness module 301.

(3) A storage system provides information receiving and presentation files (e.g., file system procfs and sysfs mechanisms). The application or related scheduler may transfer information to the application awareness module 301 by writing data to such files.

In this case, the application awareness module 301 can access the foregoing file system and obtain the information about the application, that is, the application awareness module 301 needs to have a capability of accessing the file system.

Similarly, if the code of the application can be modified, the application may directly write the information to the file system; or if the code of the application cannot be modified, the information may be written to the file system by invoking the command line tool.

(4) The application awareness module 301 provides a remote procedure call (RPC) or RESTful.

That is, the application awareness module 301 requests the information about the application from the application by using the RPC or RESTful.

In an optional implementation, the information about the application may be transferred by the application, or the information about the application may be transferred by another entity (e.g., the scheduler) independent of the application. Specifically, when the application transfers the information about the application, the information about the application may be transferred to the application awareness module 301 in the foregoing manner before the application initiates an I/O request. When the information about the application is transferred by using the scheduler, the information about the application may be transferred in the foregoing manner before the application runs or during running of the application.

It should be noted that, the information about the application transferred between the application and the application awareness module 301 includes but is not limited to at least one of the following information: I/O operation information of the application, running information of the application, and process information of the application. For example, the information about the application may be information such as a type of a file to be accessed by the application, a node to be accessed by the application, or a read/write mode of the application. The information is static attribute information determined by a modeling module of the application. The application awareness module 301 may obtain the information about the application through the extended interface before the application runs or when the application just runs. The application awareness module 301 may also obtain dynamic variable information of the application when the application just runs. For example, the application needs to access specific data based on a requirement of a special scenario, and information about the specific data is not included in the static attribute information.

Optionally, when the application awareness module 301 is implemented on a computer device used as a storage node, in an implementation shown in FIG. 3F, the application awareness module 301 may obtain the information about the application when the application initiates a read/write request.

Step 402: The application awareness module 301 sends the obtained information about the application to the policy determining module 302.

The application awareness module 301 sends the obtained information about the application to the policy determining module 302, so that the policy determining module can formulate a policy for the application based on the information about the application.

In an implementation, the application awareness module 301 may normalize the obtained information about the application, and send information obtained after normalization is performed to the policy determining module 302. The normalization processing is to convert the information about the application into a uniform format and store the information. The manner of converting into a uniform format includes but is not limited to: processing the information about the application based on a unified expression manner or arrangement order, or adding additional information, for example, adding context information. The context information includes but is not limited to: context information such as an identifier of a node on which the application is located, a name of the node on which the application is located, an IP address of the node on which the application is located, a name of the application, an application parameter, or a job description. For example, information such as an identifier of a node on which the application is located may be obtained by using an existing function module in the conventional technology.

The information about the application is normalized, so that unified storage of information about different applications can be simplified, a manner of storing the information about the application can be simplified, and storage and transmission efficiency of the information about the application can be improved. In addition, the policy determining module 302 can quickly identify the information about the application and make a related policy decision, to improve efficiency of determining a specific policy by the policy determining module 302.

For example, the application awareness module 301 may separately transfer different information through a plurality of interfaces between the application awareness module 301 and the policy determining module 302. That is, the application awareness module 301 may transfer different messages to the policy determining module 302 through different interfaces. Certainly, the application awareness module 301 may also transfer the information about the application to the policy determining module 302 through a unified interface.

A format of the message transferred by the application awareness module 301 to the policy determining module 302 may be an extensible markup language (XML) format or a JavaScript object notation (JSON) format, or may be a user-defined data structure, provided that the message can be identified by the policy determining module 302. Optionally, when the format of the message is an extensible message format, the policy determining module 302 can make a change or an addition based on a change or an addition of a requirement. In this way, applicability to a new service form can be improved, and when information about the new service is subsequently added, a format does not need to be modified, and only content of the message format needs to be modified, or new information needs to be directly added. During specific implementation, a specific message format is not limited in this embodiment of the present disclosure.

Manners of transferring information between the application awareness module 301 and the policy determining module 302 include but are not limited to: (1) direct function call; (2) shared memory; (3) inter-process communication; (4) dynamic library call; (5) network communication, such as RPC; and (6) hypertext transfer protocol (HTTP), RESTful, or the like. Manners (1) to (4) are applicable to a scenario in which the application awareness module 301 and the policy determining module 302 are implemented on one node, and manners (5) and (6) are applicable to a scenario in which the application awareness module 301 and the policy determining module 302 are implemented on different nodes.

Step 404: The policy determining module 302 determines a storage policy for the application based on the received information.

The policy determining module 302 determines, based on the received information about the application, a specific storage policy used to implement a data layout, caching, hierarchical storage, redundant backup, or the like of the application.

For example, the policy determining module 302 may obtain a policy in a policy information base, and determine the storage policy for the application with reference to a previously constructed policy and the information about the application. The policy determining module 302 may obtain the storage policy for the application recorded in the policy information base. If the policy information base does not record the storage policy for the application, reference may be made to a storage policy for a similar application. When the policy determining module 302 refers to the storage policy for the similar application, the policy determining module 302 refers, based on a type or a job parameter of the application, and with reference to a storage policy for an application that is recorded in the policy information base and whose type or job parameter is the same as the type or the job parameter of the application, or with reference to a storage policy for an application whose type or job parameter is similar to the type or the job parameter of the application. In an implementation, the policy determining module 302 formulates the storage policy for the application based on the obtained information about the application and feature information of the storage system. The hardware structure, hardware component, storage capacity, and data layout of each storage system are not the same. For example, some storage systems include a memory pool, an SSD pool, and an HDD pool, and some storage systems include only an SSD pool and an HDD pool, that is, hardware components of the storage systems are different. In some storage systems, an SSD pool is a level-2 storage resource and is directly connected to an HDD pool. In some storage systems, an SSD pool is a level-1 storage resource and is directly connected to an HDD pool. That is, hardware structures of the storage systems are different. Storage capacities of some storage systems are 100 gigabytes (GB), and storage capacities of some storage systems are 100 terabytes (TB). That is, storage capacities of the storage systems are different. In some storage systems, sizes of blocks at a bottom layer of a storage medium are different, and used redundancy backup mechanisms are different. That is, data layouts of the storage systems are different. Therefore, when the policy determining module 302 determines the storage policy for the application with reference to the information about the application and the feature information of the storage system, a feature of the storage system can be better matched, storage of the data of the I/O operation performed by the application in the storage system can be further optimized, and efficiency of performing the I/O operation by the application can be improved.

After determining the storage policy for the application, the policy determining module 302 may further add or update the determined storage policy for the application to the policy information base.

The storage policy for the application determined by the policy determining module 302 includes but is not limited to a data layout policy, a cache policy, a hierarchical storage policy, a redundancy policy, or the like. The policy determining module 302 may separately send, based on a category of the received information about the application, the information to a corresponding policy engine or policy determining submodule, to make a corresponding decision.

For example, a data layout policy engine is configured to determine a layout of to-be-written data (data to be written to a storage device) in the storage system. Specifically, the data layout policy engine may determine, with reference to the information about the application, a storage manner and/or a storage location of data written by the application to the storage system. The storage manner of data written by the application to the storage system includes at least one of the following information: a structure type of data that needs to be stored by the application, a quantity of copies of the data that needs to be stored by the application, or a parity mode of the data that needs to be stored by the application. For example, the data layout policy engine may allocate continuous storage space to data to be written to a storage device by an application, to improve data write efficiency; or may determine whether the to-be-written data is stored in a single copy or a plurality of copies, or may determine EC or a RAID of the to-be-written data.

A cache policy engine is configured to determine specific cached data and/or a cache mode, that is, cached data (data read from the storage device) is pre-cached in a specific cache medium, so that an application can obtain to-be-read data in time. Specifically, the cache policy engine may determine, with reference to the information about the application, data read by the application from the storage system and a cache mode of the read data. The cache mode of the data includes but is not limited to one or more of the following: a full cache, a partial cache, a cache clearance mechanism, a prefetch mode, or a bypass cache during data write. For example, specific data to be read by an application is written to a level-1 cache with a fastest read/write speed in advance, to improve efficiency of reading data by the application; or for a request initiated by an application for writing data only to a storage device, data is directly written to storage space of the storage device in a bypass or passthrough manner without using a cache, to reduce space occupation of the cache and improve cache utilization.

A hierarchical storage policy engine is configured to store data with different access frequencies in media of different tiers. Specifically, the hierarchical storage policy engine may determine, with reference to the information about the application, that data with different frequencies accessed by the application is stored in storage media with different read/write speeds. The hierarchical storage of the data accessed by the application determined by the hierarchical storage policy engine includes but is not limited to: storing data frequently accessed by the application to a storage medium with a high read/write speed or storing data infrequently accessed by the application to a storage medium with a low read/write speed. For example, frequently accessed data is stored in an SSD with a high read/write speed, and infrequently accessed data is stored in an HDD with a low read/write speed.

A redundancy policy engine is configured to determine a backup manner and/or a backup amount of data to be written to the storage system by the application. Specifically, the redundancy policy engine may determine, with reference to the information about the application, the redundancy policy for the data accessed by the application includes but is not limited to one or more of the following: whether to back up, a backup manner, a backup quantity, or the like. For example, disposable data does not need to be backed up; and data that needs to be read subsequently needs to be backed up. The redundancy policy optimizes the data storage manner from the perspective of a data life cycle.

It should be noted that the foregoing is merely an example for describing some policies determined by the policy determining module 302. During specific implementation, the policy determining module 302 may be further configured to determine another storage policy, that is, another policy used to optimize a data layout in the storage system or improve data access efficiency of the storage system. In addition, the policy formulated by the hierarchical storage policy engine or the policy formulated by the redundancy policy engine is a part of the policy formulated by the data layout policy engine. In this embodiment of the present disclosure, the hierarchical storage policy engine and the redundant policy engine are separately described. Hierarchical storage and redundant backup account for a relatively large proportion in optimizing storage of data to be accessed by an application and improving efficiency of accessing data by the application. An independent policy engine is used to formulate a related policy, so that a policy formulation process can be balanced and optimized, and policy formulation efficiency can be improved. During specific implementation, functions implemented by the hierarchical storage policy engine and the redundancy policy engine may be implemented by using the data layout policy engine. That is, the data layout policy engine, the hierarchical storage policy engine, and the redundancy policy engine may be integrated. Alternatively, corresponding policies may be independently formulated by using the hierarchical storage policy engine and the redundancy policy engine. That is, the data layout policy engine, the hierarchical storage policy engine, and the redundancy policy engine may be independently implemented. A specific implementation is not limited in this embodiment of the present disclosure.

Step 406: The policy execution module 303 obtains, from the policy determining module 302, the storage policy for executing the application.

After determining the storage policy for the application, the policy determining module 302 may send the determined storage policy to the policy execution module 303, or send the storage policy for the application to the policy execution module 303 when the policy execution module 303 sends a policy obtaining request to the policy determining module 302. The policy execution module 303 may also obtain the storage policy for the application from a policy library based on the information about the application, for example, a job identifier, and execute the storage policy.

After obtaining the storage policy for the application, the policy execution module 303 may first execute a part of the policy with reference to a specific policy for a specific application, and then execute the other part of the storage policy after receiving a read/write request of the application. That is, a part of the storage policy may be executed first, and step 410 is executed after the storage policy for the application is obtained. The other part of the storage policy may be executed when an access request initiated by the application is received, that is, step 410 is executed after the access request initiated by the application is received. For example, the hierarchical storage policy for the application determined by the policy determining module 302 may be executed after the policy is received. In this way, when the application initiates a related read/write request, related data can be quickly obtained, and utilization of a hierarchical storage medium can be improved. For the cache policy determined by the policy determining module 302, when a data read request of the application is received, data that needs to be read is cached in a corresponding medium based on specific data corresponding to the read request.

For example, after receiving the hierarchical storage policy for the application determined by the policy determining module 302, and before the application initiates a read/write access request, the policy execution module 303 executes the hierarchical storage policy. This may be implemented in the following two scenarios:

In one scenario, after the policy determining module 302 formulates the hierarchical storage policy for the application, the policy execution module 303 determines whether a trigger condition of the hierarchical storage policy is triggered. One implementation of the trigger condition is that the scheduler of the application pre-invokes data to be accessed by the application. When determining that the scheduler of the application needs to invoke data of the application, the policy execution module 303 executes the hierarchical storage policy, and pre-stores, in a preset storage medium, data that needs to be read by the application. For example, the data that needs to be read by the application is read from an HDD in advance and stored in an SSD. In this way, when the application initiates a read request, corresponding data can be quickly obtained.

In another scenario, before initiating an access request for reading data, the application first notifies, through an interface between the application and the storage system, the storage system of a to-be-initiated read operation and data that needs to be read. The policy execution module 303 executes, based on a request initiated by the application for to-be-accessed data, the hierarchical storage policy that has been formulated for the application, for example, reads data from an HDD in advance and stores the data in an SSD, to quickly obtain related data when the application initiates the read request.

Step 408: The policy execution module 303 receives an access request of the application.

The policy execution module 303 may invoke, through a related interface, the access request initiated by the application to the storage system.

For example, the policy execution module 303 determines whether execution of the access request is related to a related storage policy, and if execution of the access request is related to the related storage policy, executes the related storage policy, for example, executes a related cache policy.

Step 410: The policy execution module 303 executes the obtained storage policy for the application in the storage system.

The policy execution module 303 executes a related policy in the storage system based on the obtained access request of the application and the obtained storage policy for the application.

For example, in a process in which the application executes an I/O, the policy execution module 303 executes a specific optimization measure with reference to a specific policy based on information such as an identifier (ID) of a node on which the application is located, a job ID or process information of the application, and a specific data object and range that need to be read and written.

According to the method shown in FIG. 4, the information about the application is obtained, and a specific policy for the application is determined based on the information about the application. The specific policy is used to process data of the application and process a read/write request, for example, optimize a layout of data in a storage system and cache data in advance, so that a data layout of the storage system can be effectively optimized, and data access efficiency can be improved. Compared with the conventional technology in which a policy applicable to all applications is configured in a preset manner, in this method, a computer device can formulate different policies for different applications, to effectively improve compatibility of data storage and data read/write for different applications. The HCI scenario shown in FIG. 2 is used as an example. If a storage policy of a storage system causes improper data allocation, an application may often need to obtain data from another node. This increases a network latency. According to the foregoing method provided in this embodiment of the present disclosure, the storage system can sense the information about the application, so that locality of data access can be fully utilized, data is better close to computing, and a data layout of the storage system is optimized. In addition, data accessed by each specific application on each HCI node is data in an address space stored on the node. In this way, a network latency can be reduced, and data access efficiency can be improved.

The method shown in FIG. 4 may be implemented independently of an existing storage policy, or may be implemented in combination with an existing storage policy solution. When the method shown in FIG. 4 is implemented in combination with the existing storage policy solution, policy determining and execution when an application accesses data may be further optimized based on the existing storage policy solution. In addition, when a storage policy for a related application has been determined based on the method shown in FIG. 4, a policy for specifically performing an I/O operation by the application may be determined and executed based on a storage policy that has been determined based on information about the application and with reference to the method shown in FIG. 4, instead of based on implementation of the existing storage policy. When the method shown in FIG. 4 is implemented independently of the existing storage policy, storage policy determining and execution when an application accesses data may be implemented only by using the method shown in FIG. 4.

Figure 5:
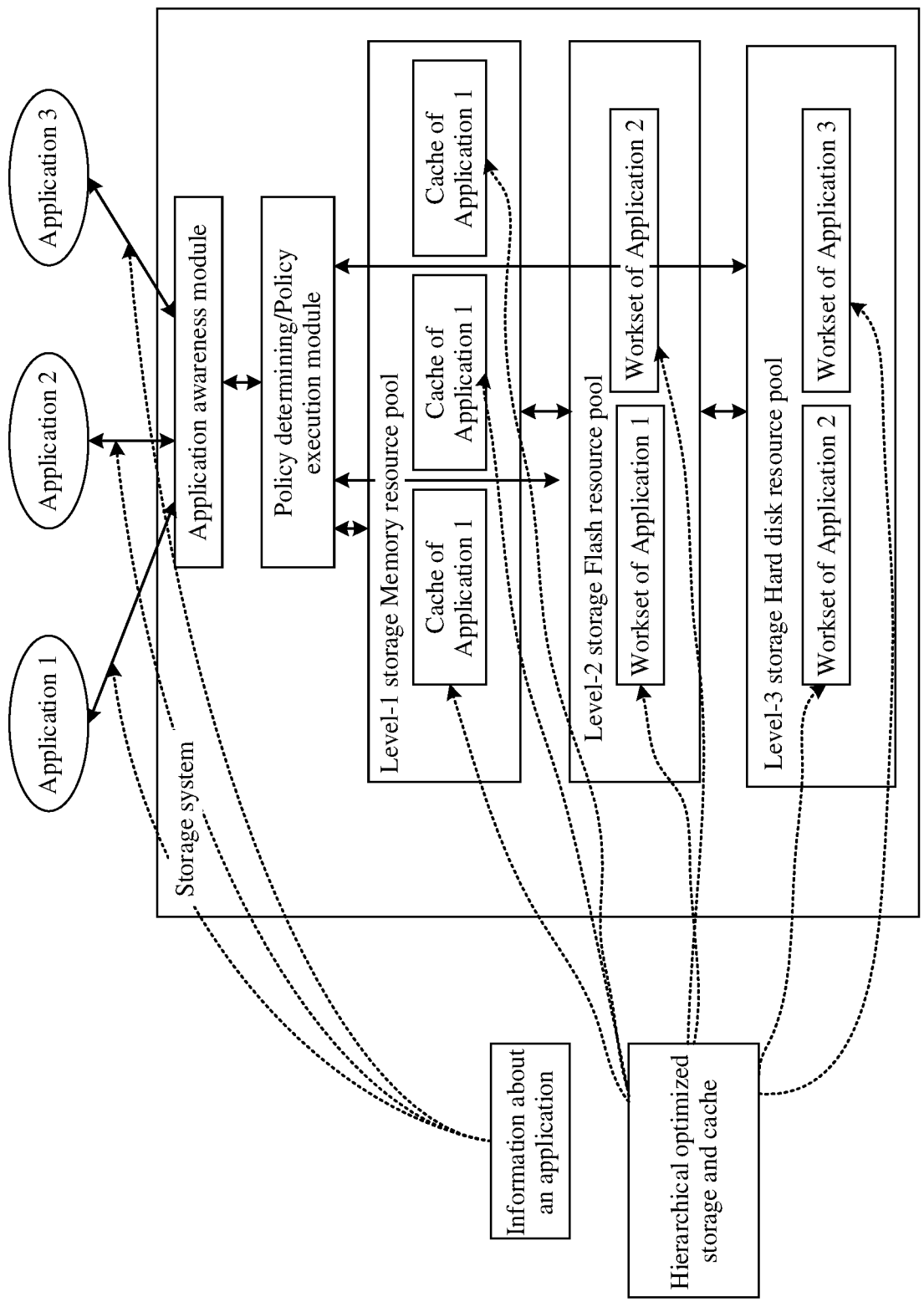
FIG. 5 is a schematic flowchart of optimizing a data management manner of a storage system based on information about an application according to an embodiment of the present disclosure.

FIG. 5 is a schematic diagram of a specific implementation of optimizing a data management manner of a storage system based on information about an application according to an embodiment of the present disclosure. As shown in FIG. 5, Application 1, Application 2, and Application 3 are different applications, and communicate with a policy determining module and a policy execution module in a storage system through an application awareness module. The application awareness module obtains information (e.g., may be I/O hints) about each application. The policy determining module implements data layout and caching of different applications (e.g., Application 1, Application 2, and Application 3) in the storage system by using a data layout policy (e.g., implementing optimized storage by using Smart Placement), a cache policy (e.g., cache in advance), or a hierarchical storage policy (e.g., storage manners of different levels). A storage medium of level-1 storage in FIG. 5, for example, a memory resource pool, may be a memory pool, and a data read/write speed of the memory pool is higher than that of the other two levels. A storage medium of level-2 storage, for example, a flash resource pool (which may be a Flash Pool), has a data read/write speed lower than that of the level-1 storage and higher than that of level-3 storage. A storage medium of the level-3 storage, for example, a hard disk or a Disk, may be a Disk Pool, and a data read/write speed of the level-3 storage is lower than that of the level-1 storage and the level-2 storage.

For example, information transferred by Application 1 to an application awareness layer is "IOPattern:SeqRead;IOSize:8 KB;FileSet:/my/file/dir/file1,/my/file/dir2/fileX". IOPattern: SeqRead displays a manner in which Application 1 reads and writes data, IOSize:8 KB displays a size of data of an I/O operation performed by Application 1, and FileSet:/my/file/dir/file1,/my/file/dir2/fileX displays a location of data to be read and written by Application 1 in the storage system.

After receiving the foregoing information about Application 1 transferred by the application awareness module, the policy determining module invokes an engine of each policy (e.g., a processing function of each policy) to formulate a policy for the application: After receiving the information, a data layout policy engine identifies that IOPattern is sequential read, considers that no processing is required, and ignores the information. After receiving the information, a cache policy engine identifies that IOPattern is sequential read, IOSize is 8 kilobyte (KB), and FileSet is /my/file/dir/file1,/my/file/dir2/fileX, the cache policy engine adds AppA:Read:Prefetch;Seq;128 KB (indicating that sequential prefetch needs to be performed when the application subsequently performs a read operation, and a granularity is 128 KB) to a policy information base, and transfers the policy to the policy execution module (Execution Engine), so that the policy execution module reads the first 128 KB data of file1 and fileX to a cache (the level-1 storage) in advance, that is, the policy execution module invokes a pre-read instruction of the cache module to load file data to the cache in advance. It should be noted that 128 KB in the foregoing formulated policy is determined based on a size of a block at a bottom layer of the storage system. Different storage systems have different sizes of blocks at the bottom layer. Therefore, 128 KB is only an example. During specific implementation, the granularity may be flexibly adjusted based on a specific condition of the storage system (different sizes of blocks at the bottom layer).

The application awareness module, the policy determining module, and the policy execution module shown in FIG. 5 may be implemented with reference to the implementations of the application awareness module 301, the policy determining module 302, and the policy execution module 303.

Figure 6:
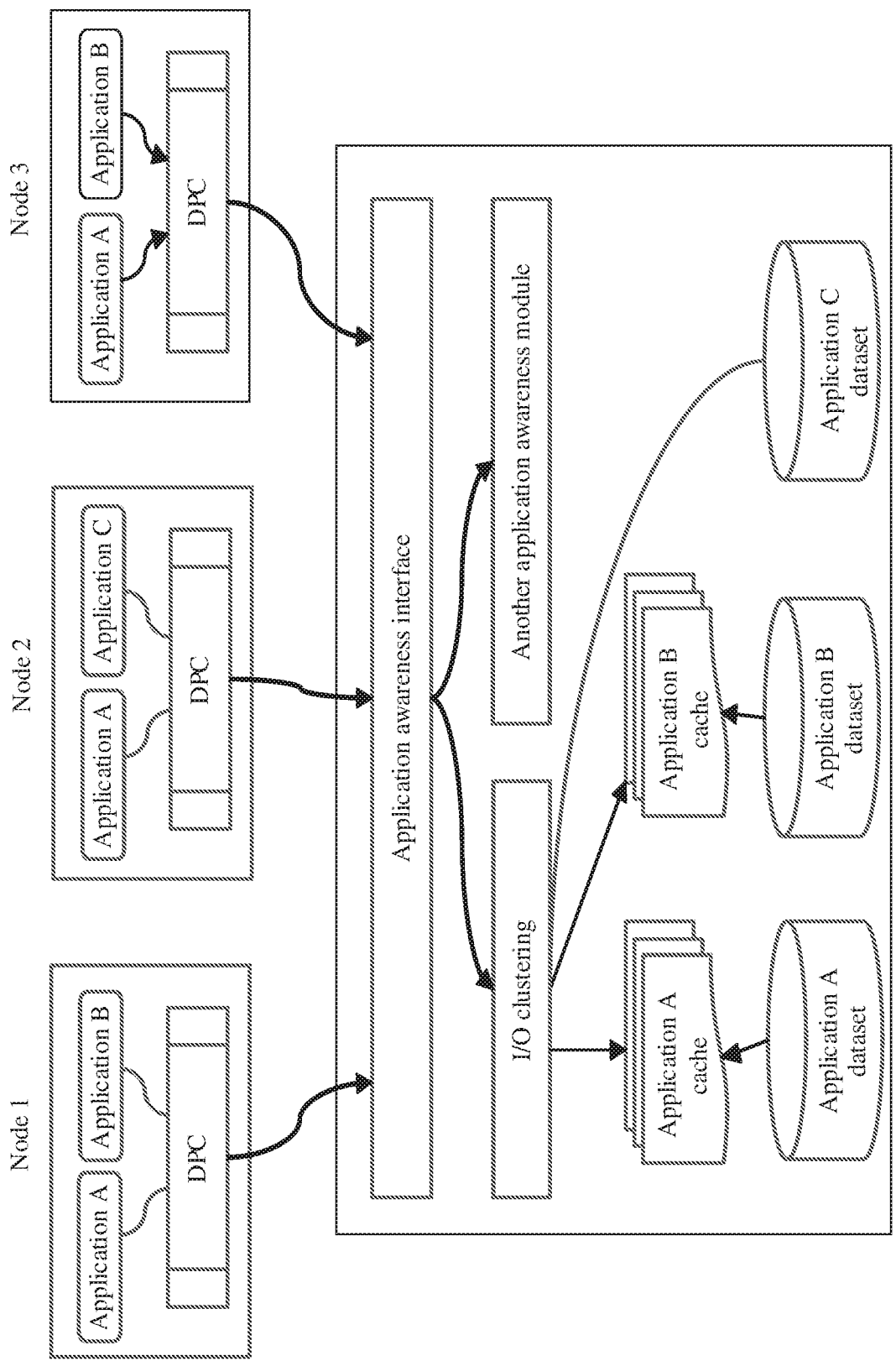
FIG. 6 is a schematic diagram of a structure of a specific application scenario in which a data management method for an application in a storage system is implemented according to an embodiment of the present disclosure.

FIG. 6 is a schematic diagram of a structure of another specific application scenario in which a data management method of a storage system is implemented according to an embodiment of the present disclosure. As shown in FIG. 6, different applications run on three nodes (e.g., computing devices), and these applications include an application A, an application B, and an application C. The application A is a mixed read/write application (such as a database application) and runs on node 1, node 2, and node 3. The application B is a read-only application (such as a video on demand system) and runs on node 1 and node 3. The application C is a write-only application (such as a log system) and runs on node 2.

A distributed private client (DPC) is deployed on each of the three nodes. The DPC can detect information such as an application type, an I/O mode, a node number, or a thread identifier, and transfer the information to a storage server along with an I/O request. The DPC in FIG. 6 is a specific implementation of the application awareness module in this embodiment of the present disclosure.

Figure 7A:
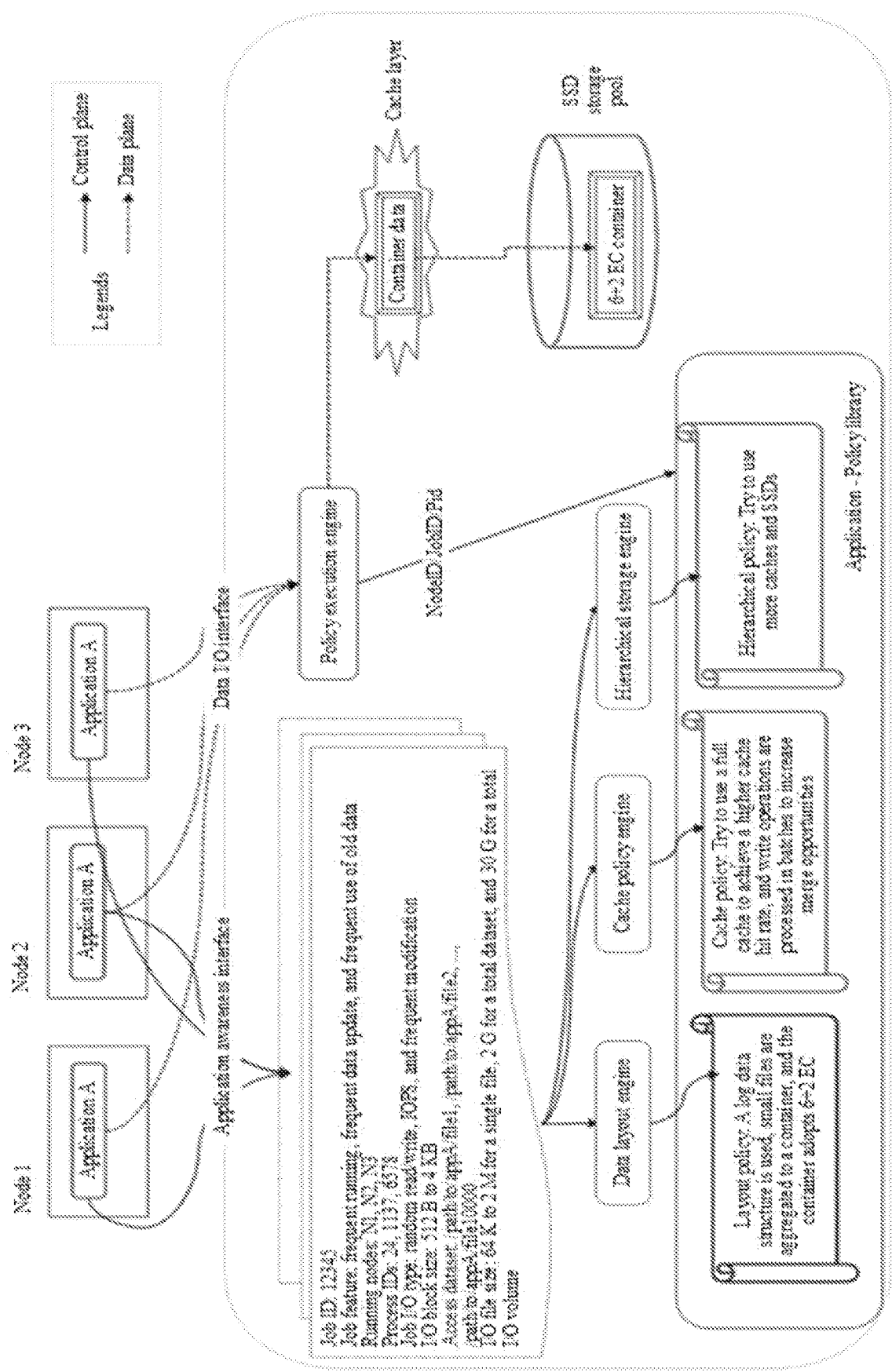
FIG. 7A is a flowchart of a specific implementation of implementing application-aware data read/write by an application A according to an embodiment of the present disclosure.
Figure 7B:
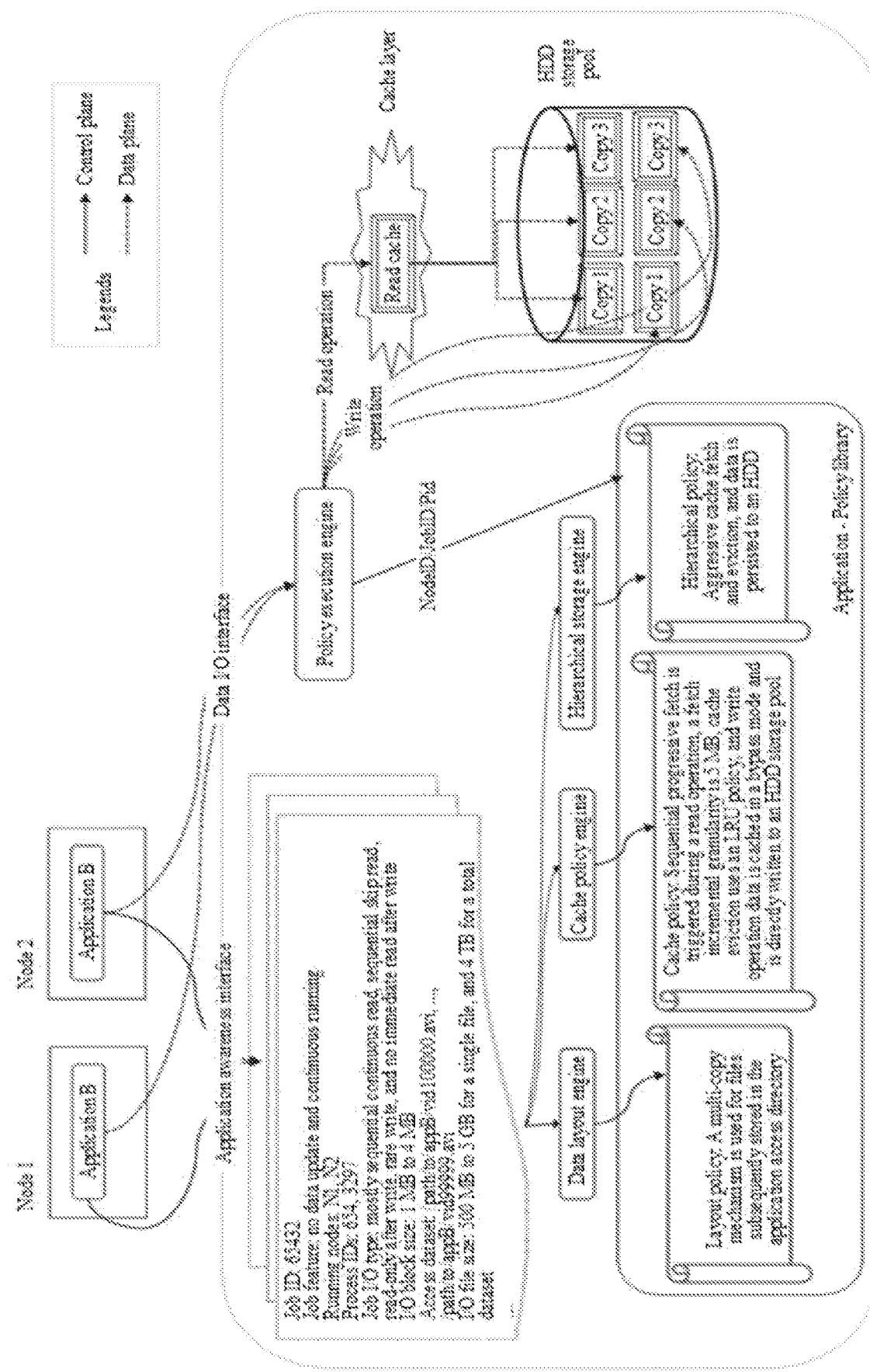
FIG. 7B is a flowchart of a specific implementation of implementing application-aware data read/write by an application B according to an embodiment of the present disclosure.
Figure 7C:
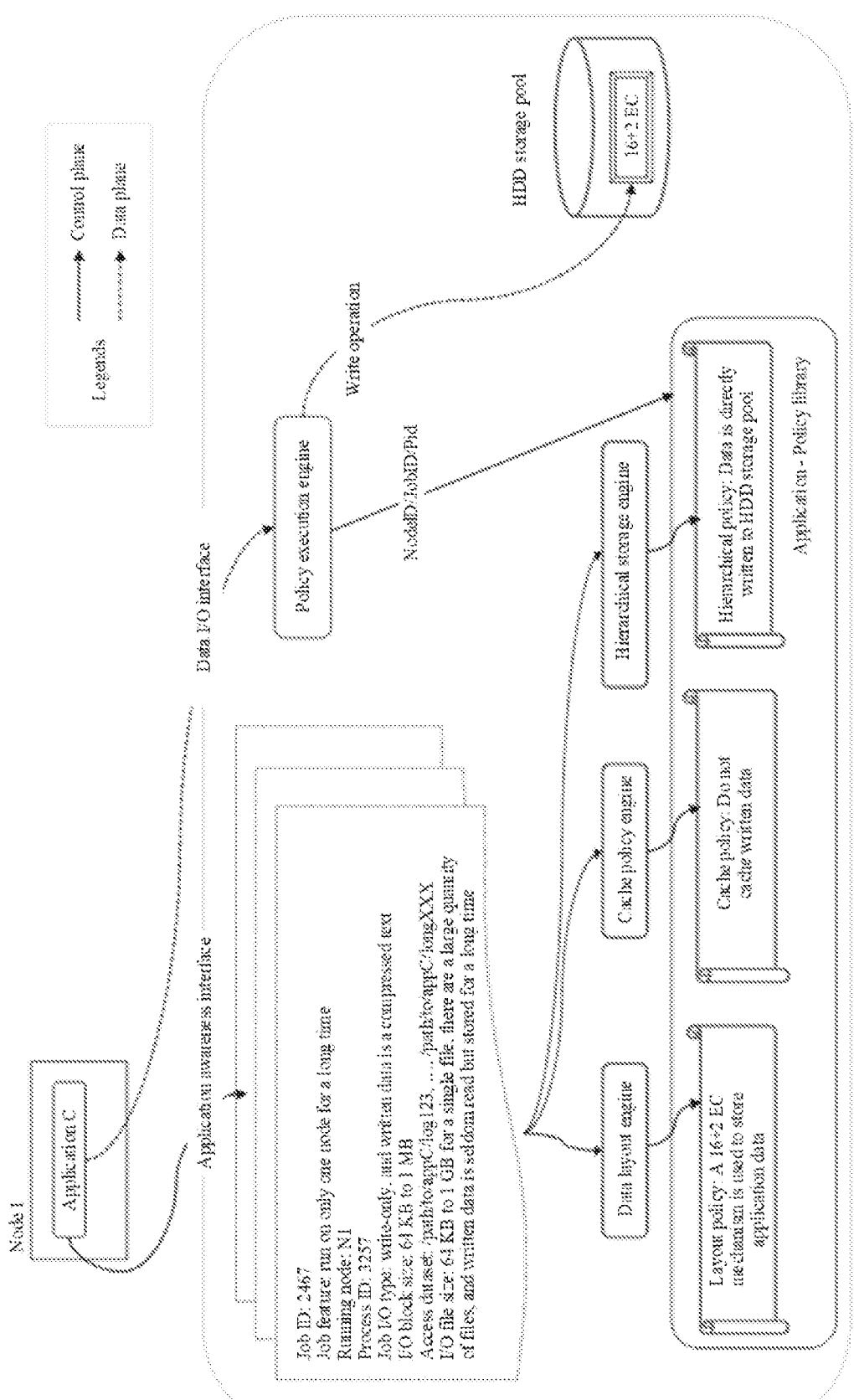
FIG. 7C is a flowchart of a specific implementation of implementing application-aware data read/write by an application C according to an embodiment of the present disclosure.

FIG. 7A, FIG. 7B, and FIG. 7C use examples to respectively show processes of determining and executing policies for an application A, an application B, and an application C. It may be understood that FIG. 7A, FIG. 7B, and FIG. 7C are merely examples for describing different applications. During specific implementation, implementation of an application awareness interface, determining of a related policy, and implementation of the policy may be different with reference to a specific scenario. In FIG. 7A, FIG. 7B, and FIG. 7C, the application awareness interface may be a specific implementation of an application awareness module, a data layout engine, a cache policy engine, and a hierarchical storage engine are specific implementations of a policy determining module, and a policy execution engine is a specific implementation of a policy execution module.

As shown in FIG. 7A, information about the application A obtained by the application awareness interface is specifically as follows:

Job ID: 12345;
Job feature: frequent running, frequent data update, and frequent use of old data;
Running nodes: N1, N2, N3;
Process IDs: 24, 1137, 6578;
Job I/O type: random read/write, I/O operations per second (IOPS), and frequent modification;
I/O block size: 512 B to 4 KB;
Access dataset: /path/to/appA/file1, /path/to/appA/file2, . . . , /path/to/appA/file10000; and
I/O file size: 64 K to 2 M for a single file, 2 G for a total dataset, and 30 G for a total I/O volume.

The mixed read/write application A features frequent running, frequent data update, and frequent use of old data. Read and write operations are small files (e.g., 512 bytes (B) to 4 KB). The job type is random read/write, IOPS, and frequent modification. After obtaining the information through the application awareness interface, the application awareness module transfers the information to the policy determining module. The policy determining module separately formulates a policy for the application A by using the data layout policy engine, the cache policy engine, and the hierarchical storage policy engine. For example, the data layout policy engine determines that a structure type of data to be stored by the application A is a log data structure, so as to reduce possible read/write amplification; determines that a storage manner of the data to be stored by the application A is packaging and storing the data, so as to improve utilization of storage space; and determines that a parity mode of the data to be stored by the application A is increasing a proportion of parity data, so as to improve data reliability. For example, based on features of multi-node I/Os of the application A and small files, the data layout policy engine uses a data layout policy of the log data structure to reduce read amplification and write amplification caused by random writes. In addition, because information of the application A is small I/Os (block size: 4 KB) and data is frequently modified, the data of the application may be packaged into an object with a 6+2 EC and whose block size is 4 KB by using a container mechanism, and a cache system is indicated not to frequently perform cache flushing during an I/O process. In this way, data accessed by a same application may be placed together as much as possible based on the information about the application A, to make full use of space and time locality. In the 6+2 EC, 6 represents a quantity of data blocks in the EC, and 2 represents a quantity of parity blocks in the EC. In this way, there is relatively much parity data, and data reliability can be improved.

The application A features frequent random small I/Os, frequent modification, small datasets, and larger I/Os than datasets. The cache policy engine formulates a cache policy in which a full cache is used to improve a hit rate of read data of the application A, and write operations are processed in batches to increase merge opportunities and reduce a quantity of I/Os sent to the backend. Optionally, when a read operation of the application A is random read, the cache policy engine may determine to disable a prefetch policy for the application A and clear a cache related to the application A, to avoid cache pollution and space waste.

The hierarchical storage policy engine formulates a policy for using a cache and an SSD to improve data read/write efficiency in consideration of features of the application A that datasets are frequently used, do not age, and have a small amount of data.

The policy execution engine, that is, the policy execution module, may query an application policy library for a policy for the application A based on at least one of a node ID (NodeID), a job ID (JobID), or a process ID (Pid), and execute the obtained policy.

As shown in FIG. 7B, information about the application B obtained by the application awareness interface is specifically as follows:

Job ID: 65432;
Job feature: no data update and continuous running;
Running nodes: N1, N2;
Process IDs: 654, 3297;
Job I/O type: mostly sequential continuous read, sequential skip read, read-only after write, rare write, and no immediate read after write;
I/O block size: 1 MB to 4 MB;
Access dataset: /path/to/appB/vid100000.avi, . . . , /path/to/appB/vid99999.avi; and
I/O file size: 500 MB to 5 GB for a single file, and 4 TB for a total dataset.

The read-only application B features mostly sequential continuous read and sequential skip read. In addition, the application B seldom modifies data after writing the data and does not read data immediately. Therefore, a large amount of data needs to be read and written. After obtaining the information through the application awareness interface, the application awareness module transfers the information to the policy determining module. The policy determining module formulates a policy for the application B by using the data layout policy engine, the cache policy engine, and the hierarchical storage policy engine.

Because the application B involves multi-node I/Os, and data is only read after the data is written, a policy formulated by the data layout policy engine is: storing the data in a file of a directory accessed by the application B, and using a multi-copy mechanism. This helps improve data reading efficiency of the application B and ensure data reliability. Most reads of the application B are sequential reads, and written data is not read immediately. Therefore, the cache policy engine determines the following policies: During a read operation, sequential progressive fetch is triggered, and a fetch incremental granularity is 5 MB, to improve data read efficiency of the application B. Cache eviction uses a least recently used (LRU) policy to reduce cache usage. Write operation data is cached in a bypass mode, the data is directly written to an HDD resource pool to avoid usage of other storage resources and improve data write efficiency. Because the application B has a large amount of data and sequential large-block reads, the hierarchical storage policy engine determines the following policy: aggressive cache fetch and eviction, and the data is persisted to the HDD storage pool.

The policy execution engine, that is, the policy execution module, may query an application policy library for a storage policy for the application B based on at least one of a NodeID, a JobID, or a Pid, and execute the obtained storage policy.

It should be noted that a dashed line in FIG. 7B shows a manner of directly writing, to the HDD, the data that needs to be written to the storage pool by the application B, which is described for a case in which the application B writes data for only once and reads data subsequently. In a case in which the application B does not need to write data but only reads data, the application B may not need to write data to the storage pool, that is, there is no write operation of writing data to the HDD storage pool by the application B.

As shown in FIG. 7C, information about the application C obtained by the application awareness interface is specifically as follows:

Job ID: 2467;
Job feature: run on only one node for a long time;
Running node: N1;
Process ID: 3257;
Job I/O type: write-only, and written data is a compressed text;
I/O block size: 64 KB to 1 MB;
Access dataset: /path/to/appC/log 123, . . . , /path/to/appC/longXXX; and
I/O file size: 64 KB to 1 GB for a single file, there are a large quantity of files, and written data is seldom read but stored for a long time.

The write-only application C writes only a compressed text to the storage pool. After obtaining the information through the application awareness interface, the application awareness module transfers the information to the policy determining module. The policy determining module formulates a policy for the application C by using the data layout policy engine, the cache policy engine, and the hierarchical storage policy engine. For example, because the application C needs to write a large amount of data to the storage pool, seldom reads the written data, and requires long-term data storage, the data layout policy engine may determine a 16+2 EC manner to store the data to be stored by the application C, where 16 represents a quantity of data blocks in the EC, and 2 represents a quantity of parity blocks in the EC. In this way, parity data occupies less space, and storage space is saved as much as possible when reliability is ensured. The cache policy engine determines, based on a write-only feature of the application C, a policy that data written by the application C does not need to be cached, so as to avoid possible occupation of cache space. The hierarchical storage policy engine determines, based on that the application C is a write-only application and data is seldom read after being written to the storage pool, to directly write the data to be written by application C to the HDD storage pool. In this way, no cache is occupied, and efficiency of writing data to the storage pool can be improved.

The policy execution engine, that is, the policy execution module, may query an application policy library for a storage policy for the application C based on at least one of a NodeID, a JobID, or a Pid, and execute the obtained storage policy.

The foregoing describes implementations of the data management method for an application provided in embodiments of the present disclosure by using specific cases of three different applications as examples. An implementation of the data management method for an application provided in embodiments of the present disclosure is further described below by using an example in which one application runs on a plurality of nodes.

Figure 8:
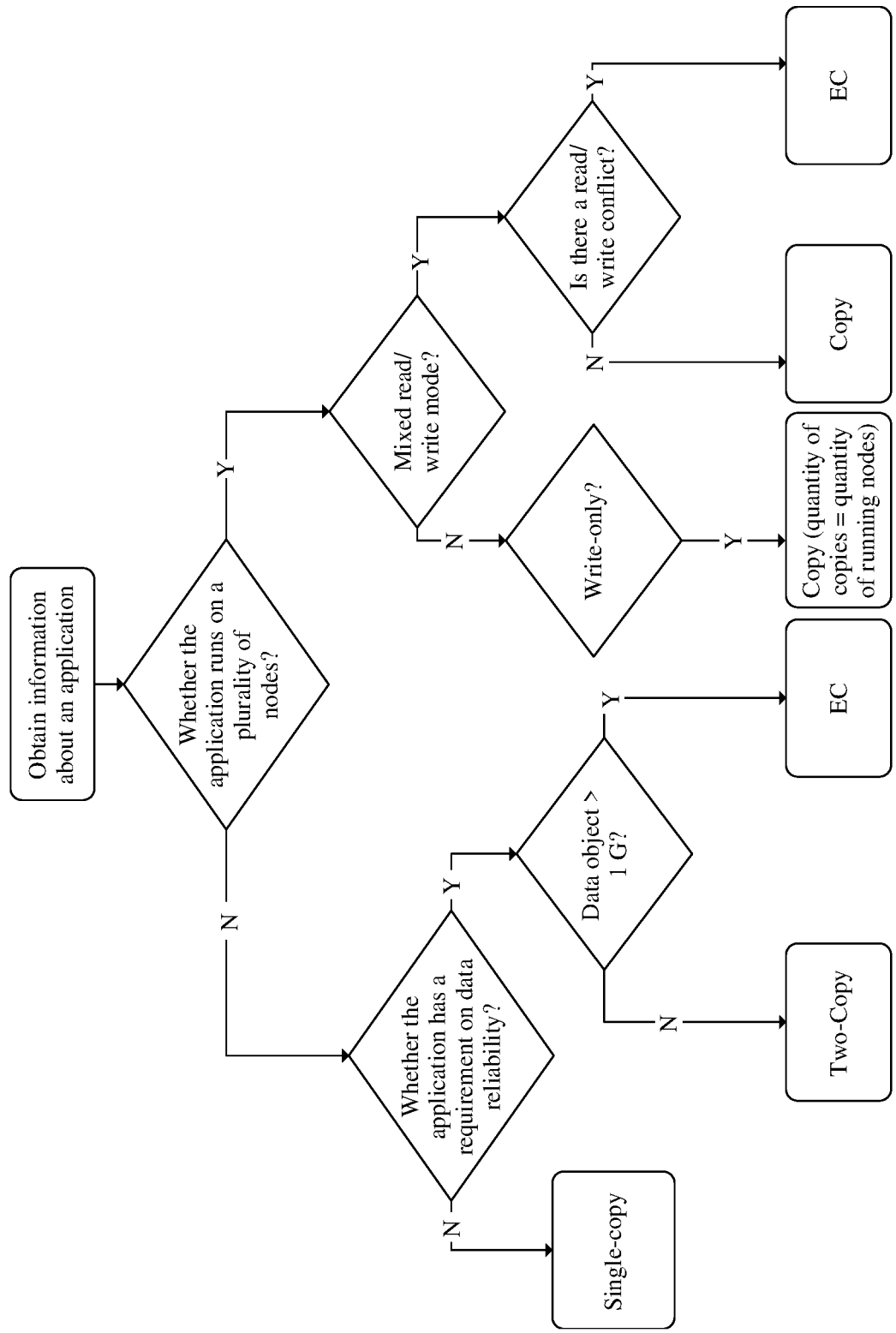
FIG. 8 is a schematic diagram of a logic implementation of a data layout decision engine according to an embodiment of the present disclosure.

FIG. 8 is a schematic logical diagram of a data layout decision process according to an embodiment of the present disclosure. As shown in FIG. 8, after an application awareness module obtains information about an application, when determining a policy for the application, a policy determining module first determines whether the application runs on one node or a plurality of nodes.

When the application runs on one node, it is determined whether the application has a reliability requirement on data access. If there is no reliability requirement, it may be determined that a data layout policy for the application is a single-copy policy, to reduce occupation of storage space. If the application has a requirement on data reliability, a size of data to be stored by the application is determined. When the data size is less than 1 GB, a policy of 2 copies is determined. In this way, data reliability is improved without occupying much storage space. If the data size is greater than 1 GB, an EC layout policy is determined. This can avoid occupying much storage space. It may be understood that the foregoing 1 GB and 2 copies are merely examples for description, and do not constitute a limitation on this embodiment of the present disclosure.

When the application runs on a plurality of nodes, the policy determining module first determines whether the application is an application in a mixed read/write mode. If the application is a write-only application, it is determined that a quantity of copies of to-be-written data is a quantity of nodes on which the application runs, to improve data reliability. If the application is a mixed read/write application, it is determined whether a read/write conflict occurs. If a conflict occurs, an EC data layout policy is determined. If no conflict occurs, a copy data layout policy is used.

In a possible implementation, the scenario shown in FIG. 8 may further include a scheduler for scheduling a job of the application. Based on an I/O status of each job in a cluster, the scheduler can schedule applications with a large quantity of I/Os to more nodes for execution, to avoid I/O conflicts between different jobs.

It may be understood that FIG. 8 is merely an example of a data layout decision engine. During specific implementation, a specific policy may also be determined based on a feature of a storage system.

According to the solution provided in this embodiment of the present disclosure, the application awareness module receives information from the application through a series of interfaces, the policy determining module formulates a proper storage policy based on the information about the application, and a policy execution module takes a targeted measure for an application request. This optimizes data storage, improves data access efficiency, and improves data access performance of the storage system.

Generally, some storage policies are set by default in the storage system. For example, a default cache policy of a cache system involves a watermark, cache flushing time, a cache size, and pre-read. The storage backend sets some stripe sizes and EC ratios by default. Generally, these default settings are suitable only for individual scenarios. In a production environment, manual tests may be required, various parameters are continuously tried, and the system is configured based on empirical values to achieve suboptimal performance. In addition, once the parameter is set, it is difficult to change the parameter. When a service mode changes, the performance is degraded.

In the foregoing implementation provided in this embodiment of the present disclosure, the application awareness module is added to the storage system, so that the information from the application can be received in real time, a change of a requirement and an access mode of the application can be sensed, behavior of the storage system is adjusted based on the information, and a data access path and a data storage manner are optimized, so that the storage system can flexibly adapt to various scenarios. For example, in a scenario in which a cache is not suitable, a write-only application with large blocks (1 MB+) directly bypasses a cache layer and uses a DirectIO technology to write data through to the storage backend. This not only saves a large amount of cache space, but also shortens an I/O path, improves cache utilization, and reduces an overall latency. For IOPS data access, a proper cache policy, such as full cache+LRU eviction, and a proper data layout (such as small file packaging) can be used, to improve data access performance. For read-only data, an effective prefetch policy can be used to load data to the cache in advance, to shorten response time and improve IOPS.

Figure 9:
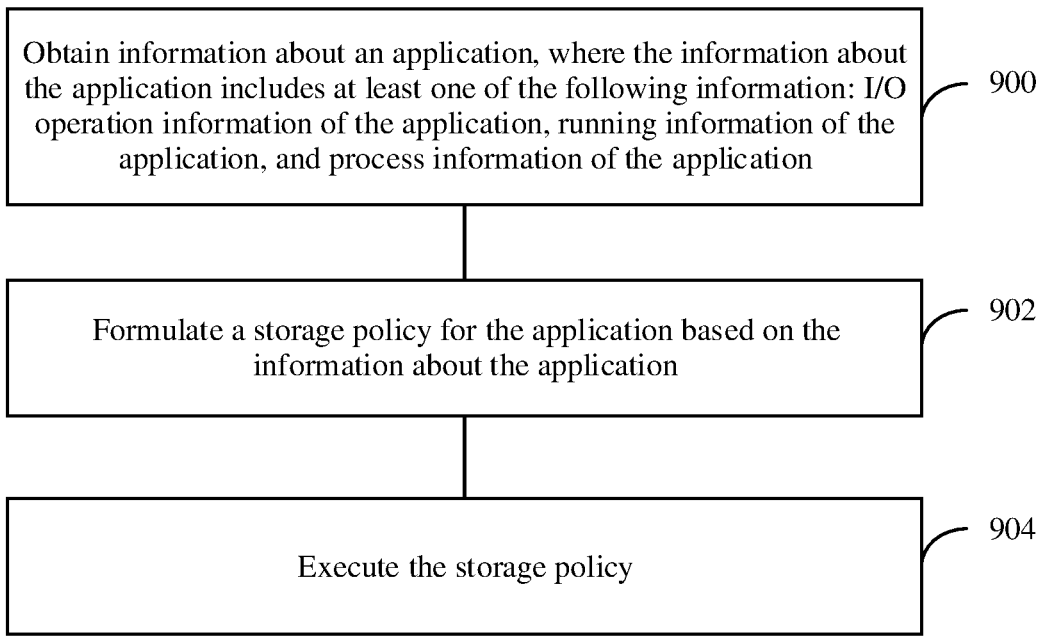
FIG. 9 is a schematic flowchart of a data management method for an application according to an embodiment of the present disclosure.

FIG. 9 is a schematic flowchart of a data management method for an application according to an embodiment of the present disclosure. Data of the application is stored in a storage system, and the storage system includes at least one storage node. As shown in FIG. 9, the method includes the following steps.

Step 900: Obtain information about the application, where the information about the application includes at least one of the following information: I/O operation information of the application, running information of the application, and process information of the application.

Step 902: Formulate a storage policy for the application based on the information about the application.

Step 904: Execute the storage policy.

According to the foregoing method, the information about the application is obtained, and the storage policy for the application is formulated based on the information about the application. The storage policy is used for storage and read/write processing of data read and written by the application, to optimize storage of data read and written by the application in the storage system and/or improve efficiency of reading and writing data by the application. Compared with the conventional technology in which a policy applicable to all applications is configured in a preset manner, in this method, different storage policies can be formulated for different applications, so that application access efficiency can be improved, a data storage manner can be optimized, and resource utilization of a storage device can be improved, to effectively improve compatibility of data storage and data read/write for different applications. For example, in a scenario in which a cache is not suitable, a write-only application with large data blocks directly bypasses a cache layer and uses a DirectIO technology to write data through to the storage backend. This not only saves a large amount of cache space, but also shortens an I/O path, improves cache utilization, and reduces an overall latency.

For a specific implementation of the method shown in FIG. 9, refer to the foregoing implementations in embodiments of the present disclosure. For example, refer to the implementation method shown in FIG. 4, or refer to the specific implementations shown in FIG. 5, FIG. 6, FIG. 7A, FIG. 7B, and FIG. 8.

Figure 10:
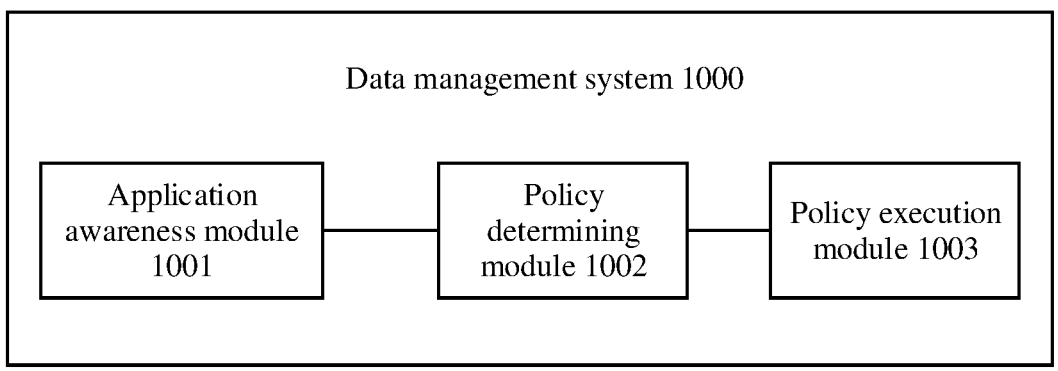
FIG. 10 is a schematic diagram of a structure of a data management system according to an embodiment of the present disclosure.

FIG. 10 is a schematic diagram of a structure of a data management system 1000 according to an embodiment of the present disclosure. As shown in FIG. 10, the data management system 1000 includes an application awareness module 1001, a policy determining module 1002, and a policy execution module 1003.

The application awareness module 1001 is configured to obtain information about an application. The information about the application includes at least one of the following information: I/O operation information of the application, running information of the application, and process information of the application. Data of the application is stored in a storage system, and the storage system includes at least one storage node.

The policy determining module 1002 is configured to formulate a storage policy for the application based on the information about the application.

The policy execution module 1003 is configured to execute the storage policy.

The data management system 1000 can obtain the information about the application, and formulate the storage policy for the application based on the information about the application, to optimize storage of data read and written by the application in the storage system and/or improve application access efficiency. Compared with the conventional technology in which a policy applicable to all applications is configured in a preset manner, in this method, the data management system 1000 can formulate different storage policies for different applications, so that application data read/write efficiency can be improved, a data storage manner can be optimized, and resource utilization of a storage device can be improved, to effectively improve compatibility of data storage and data read/write for different applications.

For a specific implementation of the data management system 1000 shown in FIG. 10, refer to the foregoing implementations in embodiments of the present disclosure. For example, refer to the implementation methods shown in FIG. 3A to FIG. 3F or FIG. 4, or refer to the specific implementations shown in FIG. 5, FIG. 6, FIG. 7A, FIG. 7B, and FIG. 8.

Figure 11:
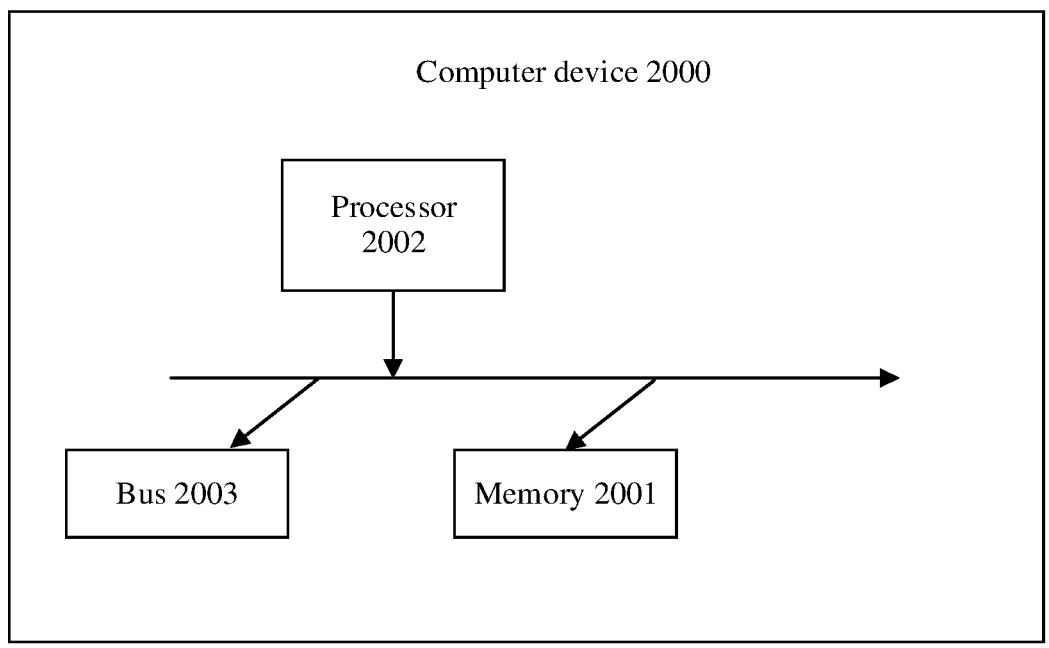
FIG. 11 is a schematic diagram of a structure of a computer device according to an embodiment of the present disclosure.

FIG. 11 is a schematic diagram of a structure of a computer device 2000 according to an embodiment of the present disclosure. As shown in FIG. 11, the computer device 2000 includes a processor 2002 and a memory 2001. The processor 2002 and the memory 2001 are connected through a bus 2003. The memory 2001 is configured to store a computer-readable execution program, and the processor 2002 is configured to execute the computer-readable execution program in the memory 2001 to implement the method described in FIG. 4 or FIG. 9. For example, the processor 2002 is configured to read the computer-readable execution program in the memory 2001 to perform the following steps: obtaining information about an application, where the information about the application includes at least one of the following information: input/output I/O operation information of the application, running information of the application, and process information of the application, where data of the application is stored in a storage system, and the storage system includes at least one storage node; formulating a storage policy for the application based on the information about the application; and executing the storage policy.

It may be understood that the processor 2002 shown in FIG. 11 may be a processor located in different devices. For example, the processor 2002 may be a processor located in a distributed storage system client, or may be a processor in a storage node of a distributed storage system. Similarly, the memory 2001 shown in FIG. 11 may be a memory located in different devices. For example, the memory 2001 may be a memory located in the distributed storage system client, or may be a memory in the storage node of the distributed storage system.

The computer device 2000 can formulate the storage policy for the application based on the information about the application, to optimize storage of data read and written by the application in the storage system and/or improve efficiency of reading and writing data by the application. Compared with the conventional technology in which a policy applicable to all applications is configured in a preset manner, in this method, the computer device can formulate different storage policies for different applications, to effectively improve compatibility of data storage and data read/write for different applications.

For a specific implementation of the compute device 2000 shown in FIG. 11, refer to the foregoing implementations in embodiments of the present disclosure. For example, refer to the implementation methods shown in FIG. 3A to FIG. 3F or FIG. 4, or refer to the specific implementations shown in FIG. 5, FIG. 6, FIG. 7A, FIG. 7B, and FIG. 8.

A person of ordinary skill in the art may be aware that, in combination with the examples described in embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in the present disclosure, it should be understood that the disclosed system, apparatus, and method may be implemented in other manners. For example, the described apparatus embodiment is merely an example. For example, the division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in embodiments of the present disclosure.

In addition, function units in embodiments of the present disclosure may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the present disclosure essentially, or the part contributing to the conventional technology, or all or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of the present disclosure. The foregoing storage medium includes: any medium that can store program code, such as a Universal Serial Bus (USB) flash drive, a removable hard disk, a ROM, a RAM, a magnetic disk, or an optical disc.

The foregoing descriptions are merely specific implementations of the present disclosure, but are not intended to limit the protection scope of the present disclosure. Any equivalent modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method implemented by computing device, the method comprising:
   obtaining application information about an application, wherein the application information comprises input/output (I/O) operation information of the application, running information of the application, and process information of the application, wherein the I/O operation information indicates one or more I/O modes of data access of a job of the application, wherein the I/O modes comprise sequential, stride, random, read-only, write-only, or mixed read/write, wherein the running information comprises a node identifier of a node running the application, and wherein the process information comprises a job identifier of the job;
   formulating a storage policy for managing data of the application based on the application information; and
   executing the storage policy to store the data to at least one storage node of a storage system or access the data from the at least one storage node.

2. The method of claim 1, further comprising further formulating the storage policy for the application prior to running the application or when receiving a data processing request of the application.

3. The method of claim 1, further comprising:
   obtaining an attribute of the storage system; and
   further formulating the storage policy for the application based on the application information and the attribute.

4. The method of claim 3, wherein the attribute comprises at least one of the following: a hardware structure of the storage system, hardware components of the storage system, a storage capacity of the storage system, or a data layout of the storage system.

5. The method of claim 1, wherein the storage policy comprises a data layout policy for determining a storage manner and/or a storage location of the data written by the application to the storage system.

6. The method of claim 5, wherein the storage manner of the data written by the application to the storage system comprises at least one of the following: a structure type of the data to be stored by the application, a quantity of copies of the data to be stored by the application, or a parity mode of the data to be stored by the application.

7. The method of claim 1, wherein the storage policy comprises a cache policy for determining data read by the application from the storage system and a cache mode of read data, and wherein the cache mode comprises at least one of the following: a full cache, a partial cache, a prefetch mode, a bypass cache during data write, or a cache clearance mechanism.

8. The method of claim 1, wherein the storage policy further comprises a hierarchical storage policy for storing data with different frequencies accessed by the application in storage media with different read/write speeds.

9. The method of claim 1, wherein the storage policy further comprises a redundancy policy for determining a backup manner and/or a backup amount of data to be written to the storage system by the application.

10. The method of claim 1, further comprising:
storing a reference policy; and
further formulating the storage policy based on the reference policy.

11. A computer device comprising:
a memory configured to store instructions; and
a processor coupled to the memory and configured to execute the instructions to cause the computer device to:
obtain application information about an application, wherein the application information comprises input/output (I/O) operation information of the application, running information of the application, and process information of the application, wherein the I/O operation information indicates one or more I/O modes of data access of a job of the application, wherein the I/O modes comprise sequential, stride, random, read-only, write-only, or mixed read/write, wherein the running information comprises a node identifier of a node running the application, and wherein the process information comprises a job identifier of the job;
formulate a storage policy for managing data of the application based on the application information, wherein the data is stored in at least one storage node of a storage system; and
execute the storage policy to store the data to the at least one storage node or access the data from the at least one storage node.

12. The computer device of claim 11, wherein the processor is further configured to execute the instructions to cause the computer device to formulate the storage policy prior to running the application or when receiving a data processing request of the application.

13. The computer device of claim 11, wherein the processor is further configured to execute the instructions to cause the computer device to:
obtain an attribute of the storage system; and
formulate the storage policy based on the application information and the attribute.

14. The computer device of claim 13, wherein the attribute comprises at least one of the following information: a hardware structure of the storage system, hardware components of the storage system, a storage capacity of the storage system, or a data layout of the storage system.

15. The computer device of claim 11, wherein the storage policy comprises a data layout policy used to determine a storage manner and/or a storage location of the data written by the application to the storage system.

16. The computer device of claim 15, wherein the storage manner of the data written by the application to the storage system comprises at least one of the following information a structure type of the data to be stored by the application, a quantity of copies of the data to be stored by the application, or a parity mode of the data to be stored by the application.

17. The computer device of claim 11, wherein the storage policy for the application comprises a cache policy for determining data read by the application from the storage system and a cache mode of read data, and wherein the cache mode comprises at least one of the following: a full cache, a partial cache, a prefetch mode, a bypass cache during data write, or a cache clearance mechanism.

18. The computer device of claim 11, wherein the storage policy further comprises a hierarchical storage policy for storing data with different frequencies accessed by the application in storage media with different read/write speeds.

19. The computer device of claim 11, wherein the processor is further configured to execute the instructions to cause the computer device to:
store a reference policy; and
formulate the storage policy based on the reference policy.

20. A computer program product comprising computer-executable instructions stored on a non-transitory computer-readable storage medium, the computer-executable instructions, when executed by a processor of a computer device, cause the computer device to:
obtain application information about an application, wherein the application information comprises input/output (I/O) operation information of the application, running information of the application, and process information of the application, wherein the I/O operation information indicates one or more I/O modes of data access of a job of the application, wherein the I/O modes comprise sequential, stride, random, read-only, write-only, or mixed read/write, wherein the running information comprises a node identifier of a node running the application, and wherein the process information comprises a job identifier of the job;
formulate a storage policy for managing data of the application based on the application information, wherein the data is stored in at least one storage node of a storage system; and
execute the storage policy to store the data to the at least one storage node or access the data from the at least one storage node.

* * * * *